(12) United States Patent
Saito et al.

(10) Patent No.: US 11,447,700 B2
(45) Date of Patent: Sep. 20, 2022

(54) LIQUID CRYSTAL CURED LAYER, PRODUCTION METHOD THEREFOR, OPTICAL FILM, POLARIZING PLATE, AND DISPLAY DEVICE

(71) Applicants: ZEON CORPORATION, Tokyo (JP); NISSAN CHEMICAL CORPORATION, Tokyo (JP)

(72) Inventors: Masakazu Saito, Tokyo (JP); Yuki Furukawa, Chiba (JP); Yuta Kanno, Chiba (JP)

(73) Assignees: ZEON CORPORATION, Tokyo (JP); NISSAN CHEMICAL CORPORATION, Tokyo (JP)

( * ) Notice: Subject to any disclaimer, the term of this patent is extended or adjusted under 35 U.S.C. 154(b) by 28 days.

(21) Appl. No.: 16/967,412

(22) PCT Filed: Feb. 13, 2019

(86) PCT No.: PCT/JP2019/005145
§ 371 (c)(1),
(2) Date: Aug. 5, 2020

(87) PCT Pub. No.: WO2019/163611
PCT Pub. Date: Aug. 29, 2019

(65) Prior Publication Data
US 2021/0214614 A1    Jul. 15, 2021

(30) Foreign Application Priority Data
Feb. 20, 2018   (JP) .............................. JP2018-027656

(51) Int. Cl.
| | |
|---|---|
| *G02F 1/1333* | (2006.01) |
| *C09K 19/04* | (2006.01) |
| *G02B 1/04* | (2006.01) |
| *G02B 1/08* | (2006.01) |
| *G02B 5/30* | (2006.01) |
| *G02F 1/1335* | (2006.01) |
| *G02F 1/13363* | (2006.01) |
| *G02F 1/1337* | (2006.01) |
| *C09K 19/42* | (2006.01) |

(52) U.S. Cl.
CPC .............. *C09K 19/04* (2013.01); *C09K 19/42* (2013.01); *G02B 1/04* (2013.01); *G02B 1/08* (2013.01); *G02B 5/305* (2013.01); *G02F 1/13363* (2013.01); *G02F 1/133528* (2013.01); *G02F 1/133711* (2013.01); *C09K 2019/0448* (2013.01)

(58) Field of Classification Search
CPC ................ C09K 19/04; C09K 19/3804; C09K 2019/0448; C09K 19/42; C09K 19/3852; C09K 19/3497; G02B 1/04; G02B 1/08; G02B 5/30; G02B 5/305; G02B 5/3016; G02B 5/3083; G02B 5/3033; G02F 1/133528; G02F 1/13363; G02F 1/133711; G02F 1/13775; G02F 1/1333; H01L 27/3232
See application file for complete search history.

(56) References Cited

U.S. PATENT DOCUMENTS

| | | | |
|---|---|---|---|
| 7,658,864 B2 | 2/2010 | Yoshikawa et al. | |
| 9,690,022 B2* | 6/2017 | Aimatsu | ........... G02F 1/133528 |
| 9,995,865 B2* | 6/2018 | Aimatsu | ............... G02B 5/3083 |
| 10,830,935 B2* | 11/2020 | Aimatsu | ................. C08F 28/06 |
| 2009/0174844 A1 | 7/2009 | Li et al. | |
| 2018/0037680 A1 | 2/2018 | Saito et al. | |
| 2018/0172889 A1 | 6/2018 | Yanai et al. | |
| 2021/0214614 A1* | 7/2021 | Saito | ....................... H01F 27/32 |

FOREIGN PATENT DOCUMENTS

| | | |
|---|---|---|
| JP | 2006106662 A | 4/2006 |
| JP | 2007217656 A | 8/2007 |
| JP | 4174192 B2 | 10/2008 |
| JP | 2010084032 A | 4/2010 |
| JP | 5209223 B2 | 6/2013 |
| WO | 2016052490 A1 | 4/2016 |
| WO | 2017022591 A1 | 2/2017 |

OTHER PUBLICATIONS

Aug. 27, 2020, International Preliminary Report on Patentability issued in the International Patent Application No. PCT/JP2019/005145.
May 14, 2019, International Search Report issued in the International Patent Application No. PCT/JP2019/005145.

* cited by examiner

*Primary Examiner* — Geraldina Visconti
(74) *Attorney, Agent, or Firm* — Kenja IP Law PC

(57) ABSTRACT

A liquid crystal cured layer formed of a cured product of a liquid crystal composition, wherein the liquid crystal composition contains a polymerizable liquid crystal compound having a reverse wavelength dispersion property, and a copolymer containing a monomer unit A including a monovalent group containing an aromatic ring and a monomer unit B containing a monovalent aliphatic hydrocarbon group optionally having a substituent, a main chain mesogen of the polymerizable liquid crystal compound in the liquid crystal cured layer is oriented at a tilt angle of 85° to 90° with respect to a layer plane of the liquid crystal cured layer.

10 Claims, 1 Drawing Sheet

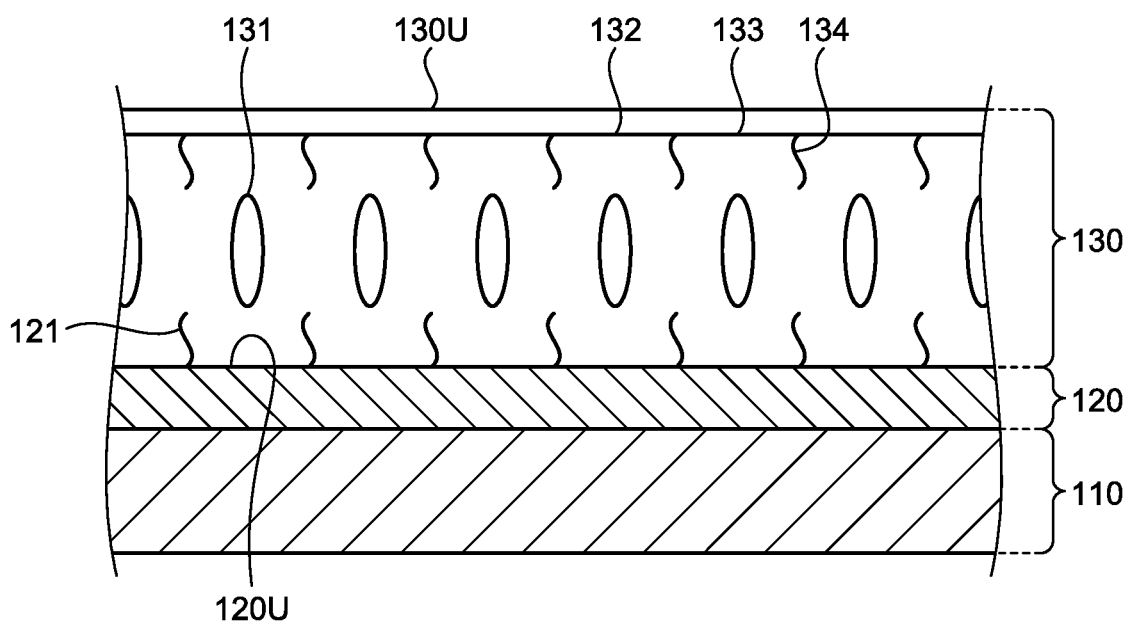

LIQUID CRYSTAL CURED LAYER, PRODUCTION METHOD THEREFOR, OPTICAL FILM, POLARIZING PLATE, AND DISPLAY DEVICE

FIELD

The present invention relates to a liquid crystal cured layer and production method therefor, an optical film, a polarizing plate, and a display device.

BACKGROUND

As an optical film such as a phase difference film, there is known an optical film produced with a liquid crystal composition. This optical film usually includes a liquid crystal cured layer formed of a cured product of a liquid crystal composition. This optical film can exhibit various optical properties by adjusting the orientation of the liquid crystal compound contained in the liquid crystal cured layer. Patent Literatures 1 to 3 have proposed a technology for orienting the liquid crystal compound in the thickness direction of the liquid crystal cured layer in such a liquid crystal cured layer.

Although most of liquid crystal compounds in prior art have a forward wavelength dispersion property, a liquid crystal compound having a reverse wavelength dispersion property has recently been proposed (Patent Literature 4).

CITATION LIST

Patent Literature

Patent Literature 1: Japanese Patent No. 4174192 B
Patent Literature 2: Japanese Patent Application Laid-Open No. 2006-106662 A
Patent Literature 3: Japanese Patent No. 5209223 B
Patent Literature 4: Japanese Patent Application Laid-Open No. 2010-084032 A

SUMMARY

Technical Problem

A liquid crystal compound having a reverse wavelength dispersion property sometimes exhibits properties different from those of a liquid crystal compound having a forward wavelength dispersion property. Therefore, with a liquid crystal compound having a reverse wavelength dispersion property, it is difficult to obtain an intended orientation state by mere application of the prior art technology for orienting the liquid crystal compound. Especially, it is particularly difficult to increase a tilt angle formed by a main chain mesogen of the liquid crystal compound with respect to a layer plane for achieving orientation in the thickness direction.

The present invention has been devised in view of the aforementioned problem, and has as its object to provide a liquid crystal cured layer formed of a cured product of a liquid crystal composition containing a polymerizable liquid crystal compound having a reverse wavelength dispersion property, in which a tilt angle formed by the main chain mesogen of the polymerizable liquid crystal compound with respect to the layer plane of the liquid crystal cured layer can be increased, and a method for producing such a liquid crystal cured layer; an optical film including the liquid crystal cured layer; a polarizing plate including the liquid crystal cured layer; and a display device including the liquid crystal cured layer.

Solution to Problem

The present inventor has attempted to form a liquid crystal cured layer on an orientation film with a liquid crystal composition that includes a combination of a polymerizable liquid crystal compound having a reverse wavelength dispersion property and a certain copolymer functioning as an orientation aid. As a result, the present inventor has found that, in the liquid crystal cured layer, the main chain mesogen of the polymerizable liquid crystal compound was oriented in the thickness direction of the liquid crystal cured layer. Based on such findings, the present inventor has completed the present invention.

That is, the present invention includes the following.
<1> A liquid crystal cured layer formed of a cured product of a liquid crystal composition, wherein the liquid crystal composition contains a polymerizable liquid crystal compound having a reverse wavelength dispersion property, and a copolymer containing a monomer unit A including a monovalent group containing an aromatic ring and a monomer unit B containing a monovalent aliphatic hydrocarbon group optionally having a substituent, a main chain mesogen of the polymerizable liquid crystal compound in the liquid crystal cured layer is oriented at a tilt angle of 85° to 90° with respect to a layer plane of the liquid crystal cured layer.

<2> The liquid crystal cured layer according to <1>, wherein the polymerizable liquid crystal compound is represented by the following formula (I):

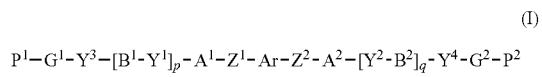

(in the formula (I),

Ar is a group represented by any of the following formulae (II-1) to (II-7), wherein the group represented by any of the following formulae (II-1) to (II-7) may optionally have a substituent other than $D^1$ to $D^6$,

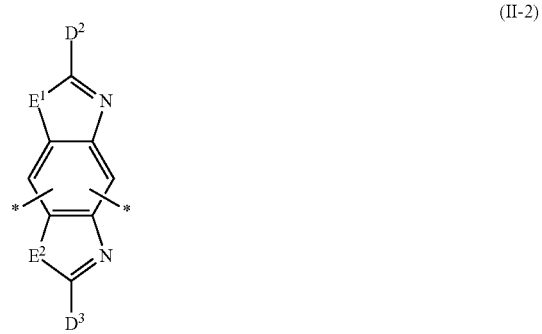

-continued

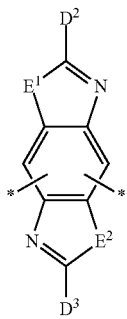

(II-3)

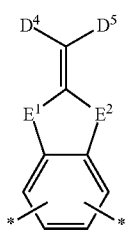

(II-4)

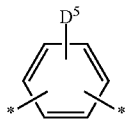

(II-5)

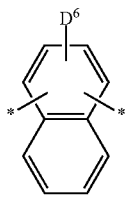

(II-6)

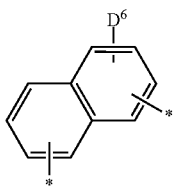

(II-7)

(in the formulae (II-1) to (II-7), the symbol "*" represents a position for bonding with $Z^1$ or $Z^2$, each of $E^1$ and $E^2$ independently represents a group selected from the group consisting of —$CR^{11}R^{12}$—, —S—, —$NR^{11}$—, —CO—, and —O—, and each of $R^{11}$ and $R^{12}$ independently represents a hydrogen atom or an alkyl group of 1 to 4 carbon atoms, each of $D^1$ to $D^3$ independently represents an aromatic hydrocarbon ring group optionally having a substituent or an aromatic heterocyclic ring group optionally having a substituent, each of $D^4$ to $D^5$ independently represents a non-cyclic group optionally having a substituent, and $D^4$ and $D^5$ may together form a ring, $D^6$ represents a group selected from the group consisting of —C($R^f$)=N—N($R^g$)$R^h$, —C($R^f$)=N—N=C($R^g$)$R^h$, and —C($R^f$)=N—N=$R^i$, $R^f$ represents a group selected from the group consisting of a hydrogen atom; and an alkyl group of 1 to 6 carbon atoms, $R^g$ represents a group selected from the group consisting of a hydrogen atom; and an organic group of 1 to 30 carbon atoms optionally having a substituent, $R^h$ represents an organic group having one or more aromatic rings selected from the group consisting of an aromatic hydrocarbon ring of 6 to 30 carbon atoms and an aromatic heterocyclic ring of 2 to 30 carbon atoms, and $R^i$ represents an organic group having one or more aromatic rings selected from the group consisting of an aromatic hydrocarbon ring of 6 to 30 carbon atoms and an aromatic heterocyclic ring of 2 to 30 carbon atoms), each of $Z^1$ and $Z^2$ independently represents one selected from the group consisting of a single bond, —O—, —O—$CH_2$—, —$CH_2$—O—, —O—$CH_2$—$CH_2$—, —$CH_2$—$CH_2$—O—, —C(=O)—O—, —O—C(=O)—, —C(=O)—S—, —S—C(=O)—, —$NR^{21}$—C(=O)—, —C(=O)—$NR^{21}$—, —$CF_2$—O—, —O—$CF_2$—, —$CH_2$—$CH_2$—, —$CF_2$—$CF_2$—, —O—$CH_2$—$CH_2$—O—, —CH=CH—C(=O)—O—, —O—C(=O)—CH=CH—, —$CH_2$—C(=O)—O—, —O—C(=O)—$CH_2$—, —$CH_2$—O—C(=O)—, —C(=O)—O—$CH_2$—, —$CH_2$—$CH_2$—C(=O)—O—, —O—C(=O)—$CH_2$—$CH_2$—, —$CH_2$—$CH_2$—O—C(=O)—, —C(=O)—O—$CH_2$—$CH_2$—, —CH=CH—, —N=CH—, —CH=N—, —N=C(CH_3)—, —C(CH_3)=N—, —N=N—, and —C≡C—, and each of $R^{21}$'s independently represents a hydrogen atom or an alkyl group of 1 to 6 carbon atoms, each of $A^1$, $A^2$, $B^1$, and $B^2$ independently represents a group selected from the group consisting of a cyclic aliphatic group optionally having a substituent, and an aromatic group optionally having a substituent, each of $Y^1$ to $Y^4$ independently represents one selected from the group consisting of a single bond, —O—, —C(=O)—, —C(=O)—O—, —O—C(=O)—, —$NR^{22}$—C(=O)—, —C(=O)—$NR^{22}$—, —O—C(=O)—O—, —$NR^{22}$—C(=O)—O—, —O—C(=O)—$NR^{22}$—, and —$NR^{22}$—C(=O)—$NR^{23}$—, and each of $R^{22}$ and $R^{23}$ independently represents a hydrogen atom or an alkyl group of 1 to 6 carbon atoms, each of $G^1$ and $G^2$ independently represents an organic group selected from the group consisting of an aliphatic hydrocarbon group of 1 to 20 carbon atoms; and a group having a structure obtained by substituting one or more of methylene groups contained in an aliphatic hydrocarbon group of 3 to 20 carbon atoms with —O— or —C(=O)—, wherein a hydrogen atom contained in the organic group of $G^1$ and $G^2$ may be substituted with an alkyl group of 1 to 5 carbon atoms, an alkoxy group of 1 to 5 carbon atoms, or a halogen atom, with a proviso that methylene groups at both ends of $G^1$ and $G^2$ are not substituted with —O— or —C(=O)—, each of $P^1$ and $P^2$ independently represents a polymerizable functional group, and each of p and q independently represents 0 or 1).

<3> The liquid crystal cured layer according to <1> or <2>, wherein the monomer unit A is represented by the following formula (A), and the monomer unit B is represented by the following formula (B):

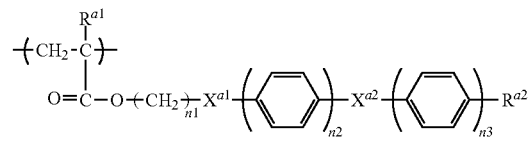

(A)

(in the formula (A), $R^{a1}$ represents a hydrogen atom or a methyl group, each of $X^{a1}$ and $X^{a2}$ independently represents a divalent linking group, $R^{a2}$ represents at least one selected from the group consisting of an alkyl group of 1 to 6 carbon atoms, an alkoxy group of 1 to 6 carbon atoms, a halogen atom, a cyano group, and an isocyanate group, n1 represents an integer of 1 to 14, n2 represents an integer of 1 or 2, and n3 represents an integer of 1 or 2.),

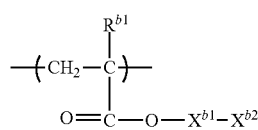

(B)

(in the formula (B), $R^{b1}$ represents a hydrogen atom or a methyl group, $X^{b1}$ represents a single bond or a divalent linking group, and $R^{b2}$ represents a monovalent aliphatic hydrocarbon group optionally having a substituent.).

<4> The liquid crystal cured layer according to any one of <1> to <3>, wherein a molar ratio of the monomer unit A relative to the monomer unit B is 90:10 to 60:40.

<5> An optical film comprising the liquid crystal cured layer according to any one of <1> to <4>.

<6> The optical film according to <5>, further comprising an orientation film.

<7> The optical film according to <5> or <6>, further comprising a substrate.

<8> The optical film according to any one of <5> to <7>, further comprising a λ/4 plate.

<9> A polarizing plate comprising the optical film according to any one of <5> to <8>, and a linear polarizer.

<10> A display device comprising the polarizing plate according to <9>.

<11> A method for producing the liquid crystal cured layer according to any one of <1> to <4>, comprising:

a step of forming an orientation film;

a step of forming a layer of a liquid crystal composition on the orientation film; and a step of curing the layer of the liquid crystal composition to obtain the liquid crystal cured layer.

Advantageous Effects of Invention

The present invention can provide a liquid crystal cured layer formed of a cured product of a liquid crystal composition containing a polymerizable liquid crystal compound having a reverse wavelength dispersion property, in which a tilt angle formed by the main chain mesogen of the polymerizable liquid crystal compound with respect to the layer plane of the liquid crystal cured layer can be increased, and a method for producing the liquid crystal cured layer; an optical film including the liquid crystal cured layer; a polarizing plate including the liquid crystal cured layer; and a display device including the liquid crystal cured layer.

BRIEF DESCRIPTION OF DRAWINGS

FIG. 1 is a cross-sectional view schematically illustrating an example of a liquid crystal composition layer formed on an orientation film.

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the following description, a "reverse wavelength dispersion property" refers to the property that the birefringence Δn(450) and Δn(550) at wavelengths of 450 nm and 550 nm satisfy the following formula (i), unless otherwise specified.

$$\Delta n(450) < \Delta n(550) \quad (i)$$

In the following description, an in-plane retardation Re of a layer is a value represented by "Re=(nx−ny)×d" unless otherwise specified. A thickness-direction retardation Rth of a layer is a value represented by "Rth=[{(nx+ny)/2}−nz]×d" unless otherwise specified. Herein, nx represents a refractive index in a direction in which the maximum refractive index is given among directions perpendicular to the thickness direction of the layer (in-plane directions), ny represents a refractive index in a direction, among the above-mentioned in-plane directions of the layer, perpendicular to the direction giving nx, nz represents a refractive index in the thickness direction of the layer, and d represents the thickness of the layer. A retardation may be measured by means of a phase difference meter ("AxoScan" manufactured by Axometrics Inc.).

In the following description, a polarizing plate is not only a rigid member, but also, for example, a flexible member such as a resin film, unless otherwise specified.

In the following description, the number of carbon atoms of a group having a substituent does not include the number of carbon atoms of the substituent, unless otherwise specified. Therefore, for example, the description "an alkyl group of 1 to 20 carbon atoms optionally having a substituent" means that the number of carbon atoms of the alkyl group itself excluding the number of carbon atoms of the substituent is 1 to 20.

[1. Summary of Liquid Crystal Cured Layer]

A liquid crystal cured layer according to an embodiment of the present invention is formed of a cured product of a liquid crystal composition that includes a polymerizable liquid crystal compound having a reverse wavelength dispersion property and a specific copolymer. The copolymer is a copolymer that contains a specific monomer unit A and monomer unit B in combination. Since this copolymer usually exhibits the effect of promoting the orientation of the main chain mesogen of the polymerizable liquid crystal compound in the thickness direction, the copolymer is hereinafter sometimes appropriately referred to as an "orientation aid".

The liquid crystal cured layer formed of the cured product of the liquid crystal composition includes the polymerizable liquid crystal compound which has polymerized or has not polymerized. Therefore, the liquid crystal cured layer contains the main chain mesogen of the polymerizable liquid crystal compound. In the liquid crystal cured layer, a tilt angle formed by this main chain mesogen of the polymerizable liquid crystal compound with respect to the layer plane of the liquid crystal cured layer can be increased. Therefore, there can be achieved a liquid crystal cured layer in which the main chain mesogen of the polymerizable liquid crystal compound is oriented in the thickness direction or in a direction close thereto of the liquid crystal cured layer.

[2. Liquid Crystal Composition]

The liquid crystal composition includes a polymerizable liquid crystal compound and a copolymer that serves as an orientation aid. The liquid crystal composition may further include an optional component in combination with the polymerizable liquid crystal compound and the orientation aid.

[2.1. Polymerizable Liquid Crystal Compound]

The polymerizable liquid crystal compound is a compound having liquid crystal properties. Therefore, when the polymerizable liquid crystal compound is blended into the composition and oriented, a liquid crystal phase can be usually developed.

The polymerizable liquid crystal compound has polymerization properties. Therefore, the polymerizable liquid crystal compound can polymerize while being in the state of exhibiting a liquid crystal phase to become a polymer which maintains the molecular orientation state of the liquid crystal phase. Therefore, in the liquid crystal cured layer, the orientation state of the polymerizable liquid crystal compound can be fixed, and the mechanical strength of the liquid crystal cured layer can be enhanced by increasing the polymerization degree of the polymerizable liquid crystal compound.

The polymerizable liquid crystal compound has a reverse wavelength dispersion property. Unless otherwise specified, the "polymerizable liquid crystal compound having a reverse wavelength dispersion property" is a polymerizable liquid crystal compound the polymer of which exhibits a reverse wavelength dispersion property, the polymer being obtained by giving homogeneous orientation to the liquid crystal compound and polymerizing the compound. "To give homogeneous orientation to the polymerizable liquid crystal compound" means that a layer containing the polymerizable liquid crystal compound is formed and the direction of the maximum refractive index of the refractive index ellipsoid of the molecules of the polymerizable liquid crystal compound in the layer is oriented in one certain direction parallel to the plane of the layer (that is, layer plane).

In general, the birefringence of a liquid crystal compound is exhibited as a difference between the refractive index in a direction showing the maximum refractive index and the refractive index in another direction intersecting that direction, in the refractive index ellipsoid of the molecules of the liquid crystal compound. The wavelength dispersibility of the refractive index in each of the aforementioned directions can vary depending on the molecular structure of the liquid crystal compound. Therefore, as to a liquid crystal compound according to an example, the refractive index measured at a long wavelength is smaller than the refractive index measured at a short wavelength in a certain direction showing a relatively large refractive index, although the difference between those refractive indices is small. On the other hand, as to the liquid crystal compound according to the aforementioned example, the refractive index measured at a long wavelength is smaller than the refractive index measured in another direction showing a relatively small refractive index, and the difference between those refractive indices is large. The difference in refractive index between the aforementioned directions of the liquid crystal compound according to such an example is small when the measurement wavelength is short, and large when the measurement wavelength is long. As a result, the liquid crystal compound can exhibit a reverse wavelength dispersion property.

As previously described, a polymerizable liquid crystal compound having a reverse wavelength dispersion property usually has a structure different from that of a liquid crystal compound having a forward wavelength dispersion property, and thereby can exhibit a reverse wavelength dispersion property. Due to such a structural difference, a liquid crystal compound having a reverse wavelength dispersion property sometimes exhibits properties different from those of a liquid crystal compound having a forward wavelength dispersion property, other than the wavelength dispersion property. The condition for achieving orientation in the thickness direction sometimes differs between a polymerizable liquid crystal compound having a reverse wavelength dispersion property and a liquid crystal compound having a forward wavelength dispersion property. It is considered that this is one of the aforementioned different properties. The present embodiment is to solve such a problem which is distinctive of a polymerizable liquid crystal compound having a reverse wavelength dispersion property, and to exhibit a specific effect different from that of a technology with a liquid crystal compound that was common in prior art.

The polymerizable liquid crystal compound has polymerization properties, and therefore usually contains a polymerizable functional group. The number of polymerizable functional groups per molecule of the polymerizable liquid crystal compound may be one, and may also be two or more. The polymerizable functional groups may be of one type, and may also be two or more types.

The molecular weight of the polymerizable liquid crystal compound is preferably 300 or more, more preferably 500 or more, and particularly preferably 800 or more, and is preferably 2000 or less, more preferably 1700 or less, and particularly preferably 1500 or less. When the polymerizable liquid crystal compound having a molecular weight in such a range is used, coating properties of the liquid crystal composition can be particularly favorable.

The birefringence $\Delta n$ at a measurement wavelength of 590 nm of the polymerizable liquid crystal compound is preferably 0.01 or more, and more preferably 0.03 or more, and is preferably 0.15 or less, and more preferably 0.10 or less. When the polymerizable liquid crystal compound having a birefringence $\Delta n$ in such a range is used, a liquid crystal cured layer having a small number of orientation defects is easily obtained. Usually, when the polymerizable liquid crystal compound having a birefringence $\Delta n$ in such a range is used, the tilt angle formed by the main chain mesogen of the polymerizable liquid crystal compound with respect to the layer plane of the liquid crystal cured layer is easily increased.

The birefringence of the liquid crystal compound may be measured by, for example, the following method.

A layer of the liquid crystal compound is prepared, and the liquid crystal compound contained in the layer is homogeneously oriented. After that, the in-plane retardation of the layer is measured. The birefringence of the liquid crystal compound can be calculated from "(in-plane retardation of layer)/(thickness of layer)". For facilitating the measurement of in-plane retardation and thickness, the homogeneously oriented layer of the liquid crystal compound may be cured. When a polymerizable liquid crystal compound is used, curing of the layer can usually be achieved by polymerizing the polymerizable liquid crystal compound.

As the polymerizable liquid crystal compound, one type thereof may be solely used, and two or more types thereof may also be used in combination at any ratio.

Preferable examples of the polymerizable liquid crystal compound having a reverse wavelength dispersion property may include a compound represented by the following formula (I).

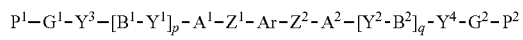
(I)

In the formula (I), Ar is a group represented by any of the following formulae (II-1) to (II-7). In the formulae (II-1) to (II-7), the symbol "*" represents a position for bonding with $Z^1$ or $Z^2$.

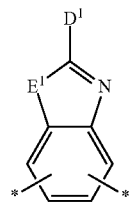
(II-1)

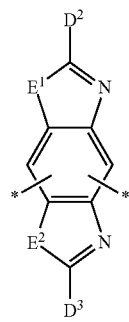
(II-2)

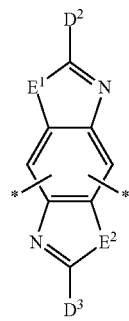
(II-3)

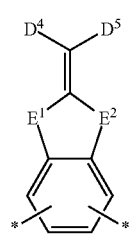
(II-4)

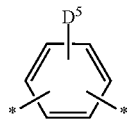
(II-5)

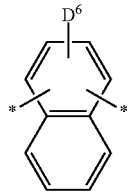
(II-6)

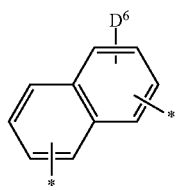
(II-7)

In the aforementioned formulae (II-1) to (II-7), each of $E^1$ and $E^2$ independently represents a group selected from the group consisting of —$CR^{11}R^{12}$—, —S—, —$NR^{11}$—, —CO—, and —O—. each of $R^{11}$ and $R^{12}$ independently represents a hydrogen atom or an alkyl group of 1 to 4 carbon atoms. Among these, it is preferable that each of $E^1$ and $E^2$ is independently —S—.

In the aforementioned formulae (II-1) to (II-7), each of $D^1$ to $D^3$ independently represents an aromatic hydrocarbon ring group optionally having a substituent or an aromatic heterocyclic ring group optionally having a substituent. Usually, the numbers of carbon atoms of the respective groups represented by each of $D^1$ to $D^3$ (including the number of carbon atoms in the substituent) is independently 2 to 100.

The number of carbon atoms of the aromatic hydrocarbon ring group in $D^1$ to $D^3$ is preferably 6 to 30.

Examples of the aromatic hydrocarbon ring group of 6 to 30 carbon atoms in $D^1$ to $D^3$ may include a phenyl group and a naphthyl group. Among these, a phenyl group is more preferable as the aromatic hydrocarbon ring group.

Examples of the substituents that the aromatic hydrocarbon ring group in $D^1$ to $D^3$ may have may include a halogen atom such as a fluorine atom and a chlorine atom; a cyano group; an alkyl group of 1 to 6 carbon atoms such as a methyl group, an ethyl group, and a propyl group; an alkenyl group of 2 to 6 carbon atoms such as a vinyl group and an allyl group; an alkyl halide group of 1 to 6 carbon atoms such as a trifluoromethyl group; an N,N-dialkylamino group of 2 to 12 carbon atoms such as a dimethylamino group; an alkoxy group of 1 to 6 carbon atoms such as a methoxy group, an ethoxy group, and an isopropoxy group; a nitro group; —$OCF_3$; —C(=O)—$R^b$; —O—C(=O)—$R^b$; —C(=O)—O—$R^b$; and —$SO_2R^a$. The number of substituents may be one or plural. The plurality of substituents may be the same as or different from one another.

$R^a$ represents a group selected from the group consisting of an alkyl group of 1 to 6 carbon atoms; and an aromatic hydrocarbon ring group of 6 to 20 carbon atoms optionally having an alkyl group of 1 to 6 carbon atoms or an alkoxy group of 1 to 6 carbon atoms as a substituent.

$R^b$ represents a group selected from the group consisting of an alkyl group of 1 to 20 carbon atoms optionally having a substituent; an alkenyl group of 2 to 20 carbon atoms optionally having a substituent; a cycloalkyl group of 3 to 12 carbon atoms optionally having a substituent; and an aromatic hydrocarbon ring group of 6 to 12 carbon atoms optionally having a substituent.

The number of carbon atoms of the alkyl group of 1 to 20 carbon atoms in $R^b$ is preferably 1 to 12, and more preferably 4 to 10. Examples of the alkyl group of 1 to 20 carbon atoms in $R^b$ may include a methyl group, an ethyl group, an n-propyl group, an isopropyl group, an n-butyl group, an isobutyl group, a 1-methylpentyl group, a 1-ethylpentyl group, a sec-butyl group, a t-butyl group, an n-pentyl group, an isopentyl group, a neopentyl group, an n-hexyl group, an isohexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, and an n-icosyl group.

Examples of the substituent that the alkyl group of 1 to 20 carbon atoms in $R^b$ may have may include a halogen atom such as a fluorine atom and a chlorine atom; a cyano group; an N,N-dialkylamino group of 2 to 12 carbon atoms such as a dimethylamino group; an alkoxy group of 1 to 20 carbon atoms such as a methoxy group, an ethoxy group, an isopropoxy group, and a butoxy group; an alkoxy group of 1 to 12 carbon atoms substituted by an alkoxy group of 1 to 12 carbon atoms such as a methoxymethoxy group and an methoxyethoxy group;

a nitro group; an aromatic hydrocarbon ring group of 6 to 20 carbon atoms such as a phenyl group and a naphthyl group; an aromatic heterocyclic ring group of 2 to 20 carbon atoms such as a triazolyl group, a pyrrolyl group, a furanyl group, a thienyl group, a triazolyl group, and a benzothiazol-2-ylthio group; a cycloalkyl group of 3 to 8 carbon atoms such as a cyclopropyl group, a cyclopentyl group, and a cyclohexyl group; a cycloalkyloxy group of 3 to 8 carbon atoms such as a cyclopentyloxy and a cyclohexyloxy group;

a cyclic ether group of 2 to 12 carbon atoms such as a tetrahydrofuranyl group, a tetrahydropyranyl group, a dioxolanyl group, and a dioxanyl group; an aryloxy group of 6 to 14 carbon atoms such as a phenoxy group and a naphthoxy group; a fluoroalkyl group of 1 to 12 carbon atoms in which one or more hydrogen atoms have been substituted with a fluorine atom such as a trifluoromethyl group, a pentafluoroethyl group, and —$CH_2CF_3$; a benzofuryl group; a benzopyranyl group; a benzodioxolyl group; and a benzodioxanyl group. The number of substituents may be one or plural. The plurality of substituents may be the same as or different from one another.

The number of carbon atoms of the alkenyl group of 2 to 20 carbon atoms in $R^b$ is preferably 2 to 12. Examples of the alkenyl group of 2 to 20 carbon atoms in $R^b$ may include a vinyl group, a propenyl group, an isopropenyl group, a butenyl group, an isobutenyl group, a pentenyl group, a hexenyl group, a heptenyl group, an octenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadenyl group, and an icocenyl group.

Examples of the substituent that the alkenyl group of 2 to 20 carbon atoms in $R^b$ may have may include the same examples as those of the substituent that the alkyl group of 1 to 20 carbon atoms in $R^b$ may have. The number of substituents may be one or plural. The plurality of substituents may be the same as or different from one another.

Examples of the cycloalkyl group of 3 to 12 carbon atoms in $R^b$ may include a cyclopropyl group, a cyclobutyl group, a cyclopentyl group, a cyclohexyl group, and a cyclooctyl group. Among these, as the cycloalkyl group, a cyclopentyl group and a cyclohexyl group are preferable.

Examples of the substituent that the cycloalkyl group of 3 to 12 carbon atoms in $R^b$ may have may include a halogen atom such as a fluorine atom and a chlorine atom; a cyano group; an N,N-dialkylamino group of 2 to 12 carbon atoms such as a dimethylamino group; an alkyl group of 1 to 6 carbon atoms such as a methyl group, an ethyl group, and a propyl group; an alkoxy group of 1 to 6 carbon atoms such as a methoxy group, an ethoxy group, and an isopropoxy group; a nitro group; and an aromatic hydrocarbon ring group of 6 to 20 carbon atoms such as a phenyl group and a naphthyl group. Among these, as the substituent of the cycloalkyl group, a halogen atom such as a fluorine atom and a chlorine atom; a cyano group; an alkyl group of 1 to 6 carbon atoms such as a methyl group, an ethyl group, and a propyl group; an alkoxy group of 1 to 6 carbon atoms such as a methoxy group, an ethoxy group, and an isopropoxy group; a nitro group; and an aromatic hydrocarbon ring group of 6 to 20 carbon atoms such as a phenyl group and a naphthyl group are preferable. The number of substituents may be one or plural. The plurality of substituents may be the same as or different from one another.

Examples of the aromatic hydrocarbon ring group of 6 to 12 carbon atoms in $R^b$ may include a phenyl group, a 1-naphthyl group, and a 2-naphthyl group. Among these, a phenyl group is preferable as the aromatic hydrocarbon ring group.

Examples of the substituent that the aromatic hydrocarbon ring group of 6 to 12 carbon atoms in $R^b$ may have may include a halogen atom such as a fluorine atom and a chlorine atom; a cyano group; an N,N-dialkylamino group of 2 to 12 carbon atoms such as a dimethylamino group; an alkoxy group of 1 to 20 carbon atoms such as a methoxy group, an ethoxy group, an isopropoxy group, and a butoxy group; an alkoxy group of 1 to 12 carbon atoms having an alkoxy group of 1 to 12 carbon atoms as a substituent such as a methoxymethoxy group and a methoxyethoxy group; a nitro group; an aromatic heterocyclic ring group of 2 to 20 carbon atoms such as a triazolyl group, a pyrrolyl group, a furanyl group, and a thiophenyl group; a cycloalkyl group of 3 to 8 carbon atoms such as a cyclopropyl group, a cyclopentyl group, and a cyclohexyl group; a cycloalkyloxy group of 3 to 8 carbon atoms such as a cyclopentyloxy group and a cyclohexyloxy group; a cyclic ether group of 2 to 12 carbon atoms such as a tetrahydrofuranyl group, a tetrahydropyranyl group, a dioxolanyl group, and a dioxanyl group; an aryloxy group of 6 to 14 carbon atoms such as a phenoxy group and a naphthoxy group; a fluoroalkyl group of 1 to 12 carbon atoms in which one or more hydrogen atoms have been substituted with a fluorine atom such as a trifluoromethyl group, a pentafluoroethyl group, and —$CH_2CF_3$; —$OCF_3$; a benzofuryl group; a benzopyranyl group; a benzodioxolyl group; and a benzodioxanyl group. Among these, as the substituent of the aromatic hydrocarbon ring group, a halogen atom such as a fluorine atom and a chlorine atom; a cyano group; an alkoxy group of 1 to 20 carbon atoms such as a methoxy group, an ethoxy group, an isopropoxy group, and a butoxy group; a nitro group; an aromatic heterocyclic ring group of 2 to 20 carbon atoms such as a furanyl group and a thiophenyl group; a cycloalkyl group of 3 to 8 carbon atoms such as a cyclopropyl group, a cyclopentyl group, and a cyclohexyl group; a fluoroalkyl group of 1 to 12 carbon atoms in which one or more hydrogen atoms have been substituted with a fluorine atom such as a trifluoromethyl group, a pentafluoroethyl group, and —CH$_2$CF$_3$; and —OCF$_3$ are preferable. The number of substituents may be one or plural. The plurality of substituents may be the same as or different from one another.

The number of carbon atoms of the aromatic heterocyclic ring group in D$^1$ to D$^3$ is preferably 2 to 30. Examples of the aromatic heterocyclic ring group of 2 to 30 carbon atoms in D$^1$ to D$^3$ may include a 1-benzofuranyl group, a 2-benzofuranyl group, an imidazolyl group, an indolinyl group, a furazanyl group, an oxazolyl group, a quinolyl group, a thiadiazolyl group, a triazolyl group, a thiazolopyrazinyl group, a thiazolopyridyl group, a thiazolopyridazinyl group, a thiazolopyrimidinyl group, a thienyl group, a triazinyl group, a triazolyl group, a naphthyridinyl group, a pyrazinyl group, a pyrazolyl group, a pyranyl group, a pyridyl group, a pyridazinyl group, a pyrimidinyl group, a pyrrolyl group, a phthalazinyl group, a furanyl group, a benzo[c]thienyl group, a benzo[b]thienyl group, a benzoisoxazolyl group, a benzoisothiazolyl group, a benzimidazolyl group, a benzoxadiazolyl group, a benzoxazolyl group, a benzothiadiazolyl group, a benzothiazolyl group, a benzotriazinyl group, a benzotriazoryl group, and a benzopyrazolyl group. Among these, as the aromatic heterocyclic ring group, a monocyclic aromatic heterocyclic ring group such as a furanyl group, a pyranyl group, a thienyl group, an oxazolyl group, a furazanyl group, a thiazolyl group, and a thiadiazolyl group; and an aromatic heterocyclic ring group having a condensed ring such as a benzothiazolyl group, a benzoxazolyl group, a quinolyl group, a 1-benzofuranyl group, a 2-benzofuranyl group, a phthalimide group, a benzo[c]thienyl group, a benzo[b]thienyl group, a thiazolopyridyl group, a thiazolopyrazinyl group, a benzoisoxazolyl group, a benzoxadiazolyl group, and a benzothiadiazolyl group are more preferable.

Examples of the substituent that the aromatic heterocyclic ring group in D$^1$ to D$^3$ may have may include the same examples as those of the substituent that the aromatic hydrocarbon ring group in D$^1$ to D$^3$ may have. The number of substituents may be one or plural. The plurality of substituents may be the same as or different from one another.

In the aforementioned formulae (II-1) to (II-7), each of D$^4$ to D$^5$ independently represents a non-cyclic group optionally having a substituent. D$^4$ and D$^5$ may together form a ring. Usually, the numbers of carbon atoms of the respective groups represented by each of D$^4$ to D$^5$ (including the number of carbon atoms in the substituent) is independently 1 to 100.

The number of carbon atoms of the non-cyclic group in D$^4$ to D$^5$ is preferably 1 to 13. Examples of the non-cyclic group in D$^4$ to D$^5$ may include an alkyl group of 1 to 6 carbon atoms; a cyano group; a carboxyl group; a fluoroalkyl group of 1 to 6 carbon atoms; an alkoxy group of 1 to 6 carbon atoms; —C(=O)—CH$_3$; —C(=O)NHPh; and —C(=O)—OR$^x$. Among these, as the non-cyclic group, a cyano group, a carboxylic group, —C(=O)—CH$_3$, —C(=O)NHPh, —C(=O)—OC$_2$H$_5$, —C(=O)—OC$_4$H$_9$, —C(=O)—OCH(CH$_3$)$_2$, —C(=O)—OCH$_2$CH$_2$CH(CH$_3$)—OCH$_3$, —C(=O)—OCH$_2$CH$_2$C(CH$_3$)$_2$—OH, and —C(=O)—OCH$_2$CH(CH$_2$CH$_3$)—C$_4$H$_9$ are preferable. The aforementioned symbol "Ph" represents a phenyl group. The aforementioned symbol RX represents an organic group of 1 to 12 carbon atoms. Specific examples of the Rx may include an alkoxy group of 1 to 12 carbon atoms and an alkyl group of 1 to 12 carbon atoms optionally being substituted with a hydroxyl group.

Examples of the substituent that the non-cyclic group in D$^4$ to D$^5$ may have may include the same examples as those of the substituent that the aromatic hydrocarbon ring group in D$^1$ to D$^3$ may have. The number of substituents may be one or plural. The plurality of substituents may be the same as or different from one another.

When D$^4$ and D$^5$ together form a ring, an organic group containing the ring is formed by the aforementioned D$^4$ and D$^5$. Examples of the organic group may include groups represented by the following formulae. In the following formulae, the symbol "*" represents a position at which each organic group is bonded to the carbon to which D$^4$ and D$^5$ are bonded.

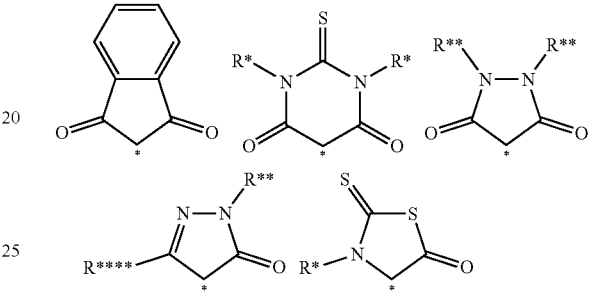

R* represents an alkyl group of 1 to 3 carbon atoms.

R** represents a group selected from the group consisting of an alkyl group of 1 to 3 carbon atoms and a phenyl group optionally having a substituent.

R*** represents a group selected from the group consisting of an alkyl group of 1 to 3 carbon atoms and a phenyl group optionally having a substituent.

R**** represents a group selected from the group consisting of a hydrogen atom, an alkyl group of 1 to 3 carbon atoms, a hydroxyl group, and —COOR$^{13}$. R$^{13}$ represents an alkyl group of 1 to 3 carbon atoms.

Examples of the substituents that the phenyl group may have may include a halogen atom, an alkyl group, an alkenyl group, an aryl group, a heterocyclic ring group, a hydroxyl group, a carboxyl group, an alkoxy group, an aryloxy group, an acyloxy group, a cyano group, and an amino group. Among these, as a substituent, a halogen atom, an alkyl group, a cyano group, and an alkoxy group are preferable. The number of substituents that the phenyl group has may be one or plural. The plurality of substituents may be the same as or different from one another.

In the aforementioned formulae (II-5) to (II-7), D$^6$ represents a group selected from the group consisting of —C(R$^f$)=N—N(R$^g$)R$^h$, —C(R$^f$)=N—N=C(R$^g$)R$^h$, and —C(R$^f$)=N—N=R$^i$. The number of carbon atoms of the group represented by D$^6$ (including the number of carbon atoms in the substituent) is usually 3 to 100.

R$^f$ represents a group selected from the group consisting of a hydrogen atom; and an alkyl group of 1 to 6 carbon atoms such as a methyl group, an ethyl group, a propyl group, and an isopropyl group.

R$^g$ represents a group selected from the group consisting of a hydrogen atom; and an organic group of 1 to 30 carbon atoms optionally having a substituent.

Examples of the organic group of 1 to 30 carbon atoms optionally having a substituent in R$^g$ may include an alkyl group of 1 to 20 carbon atoms optionally having a substituent; a group in which one or more of —CH$_2$— groups contained in the alkyl group of 1 to 20 carbon atoms are substituted with —O—, —S—, —O—C(=O), —C(=O)—O—, or —C(=O)— (except for cases where two or more —O—'s or two or more —S—'s are adjacently interposed); an alkenyl group of 2 to 20 carbon atoms optionally having a substituent; an alkynyl group of 2 to 20 carbon atoms optionally having a substituent; a cycloalkyl group of 3 to 12 carbon atoms optionally having a substituent; an aromatic hydrocarbon ring group of 6 to 30 carbon atoms optionally having a substituent; an aromatic heterocyclic ring group of 2 to 30 carbon atoms optionally having a substituent; -$G^x$-$Y^x$-$F^x$; —$SO_2R^a$; —C(=O)—$R^b$; and —CS—NH—$R^b$. The meanings of $R^a$ and $R^b$ are as described above.

Preferred ranges of the number of carbon atoms of the alkyl group of 1 to 20 carbon atoms in $R^g$ and examples thereof are the same as those of the alkyl group of 1 to 20 carbon atoms in $R^b$.

Examples of the substituent that the alkyl group of 1 to 20 carbon atoms in $R^g$ may have may include a halogen atom such as a fluorine atom and a chlorine atom; a cyano group; an N,N-dialkylamino group of 2 to 12 carbon atoms such as a dimethylamino group; an alkoxy group of 1 to 20 carbon atoms such as a methoxy group, an ethoxy group, an isopropoxy group, and a butoxy group; an alkoxy group of 1 to 12 carbon atoms having an alkoxy group of 1 to 12 carbon atoms as a substituent such as a methoxymethoxy group and a methoxyethoxy group; a nitro group; an aromatic hydrocarbon ring group of 6 to 20 carbon atoms such as a phenyl group and a naphthyl group; an aromatic heterocyclic ring group of 2 to 20 carbon atoms such as a triazolyl group, a pyrrolyl group, a furanyl group, and a thiophenyl group; a cycloalkyl group of 3 to 8 carbon atoms such as a cyclopropyl group, a cyclopentyl group, and a cyclohexyl group; a cycloalkyloxy group of 3 to 8 carbon atoms such as a cyclopentyloxy group and a cyclohexyloxy group; a cyclic ether group of 2 to 12 carbon atoms such as a tetrahydrofuranyl group, a tetrahydropyranyl group, a dioxolanyl group, and a dioxanyl group; an aryloxy group of 6 to 14 carbon atoms such as a phenoxy group and a naphthoxy group; a fluoroalkyl group of 1 to 12 carbon atoms in which one or more hydrogen atoms have been substituted with a fluorine atom; a benzofuryl group; a benzopyranyl group; a benzodioxolyl group; a benzodioxanyl group; —$SO_2R^a$; —$SR^b$; an alkoxy group of 1 to 12 carbon atoms substituted with —$SR^b$; and a hydroxyl group. The meanings of $R^a$ and $R^b$ are as described above. The number of substituents may be one or plural. The plurality of substituents may be the same as or different from one another.

Preferred ranges of the number of carbon atoms of the alkenyl group of 2 to 20 carbon atoms in $R^g$ and examples thereof are the same as those of the alkenyl group of 2 to 20 carbon atoms in $R^b$.

Examples of the substituents that the alkenyl group of 2 to 20 carbon atoms in $R^g$ may have may include the same examples as those of the substituent that the alkyl group of 1 to 20 carbon atoms in $R^g$ may have. The number of substituents may be one or plural. The plurality of substituents may be the same as or different from one another.

Examples of the alkynyl group of 2 to 20 carbon atoms in $R^g$ may include an ethynyl group, a propynyl group, a 2-propynyl group (a propargyl group), a butynyl group, a 2-butynyl group, a 3-butynyl group, a pentynyl group, a 2-pentynyl group, a hexynyl group, a 5-hexynyl group, a heptynyl group, an octynyl group, a 2-octynyl group, a nonanyl group, a decanyl group, and a 7-decanyl group.

Examples of the substituent that the alkynyl group of 2 to 20 carbon atoms in $R^g$ may have may include the same examples as those of the substituent that the alkyl group of 1 to 20 carbon atoms in $R^g$ may have. The number of substituents may be one or plural. The plurality of substituents may be the same as or different from one another.

Examples of the cycloalkyl group of 3 to 12 carbon atoms in $R^g$ may include the same example as those of the cycloalkyl group of 3 to 12 carbon atoms in $R^b$.

Examples of the substituent that the cycloalkyl group of 3 to 12 carbon atoms in $R^g$ may have may include the same examples as those of the substituent that the alkyl group of 1 to 20 carbon atoms in $R^g$ may have. The number of substituents may be one or plural. The plurality of substituents may be the same as or different from one another.

Examples of the aromatic hydrocarbon ring group of 6 to 30 carbon atoms in $R^g$ may include the same examples as those of the aromatic hydrocarbon ring group of 6 to 30 carbon atoms in $D^1$ to $D^3$.

Examples of the substituent that the aromatic hydrocarbon ring group of 6 to 30 carbon atoms in $R^g$ may have may include the same examples as those of the substituent that the aromatic hydrocarbon ring group in $D^1$ to $D^3$ may have. The number of substituents may be one or plural. The plurality of substituents may be the same as or different from one another.

Examples of the aromatic heterocyclic ring group of 2 to 30 carbon atoms in $R^g$ may include the same examples as those of the aromatic heterocyclic ring group of 2 to 30 carbon atoms in $D^1$ to $D^3$.

Examples of the substituent that the aromatic heterocyclic ring group of 2 to 30 carbon atoms in $R^g$ may have may include the same examples as those of the substituent that the aromatic hydrocarbon ring group in $D^1$ to $D^3$. The number of substituents may be one or plural. The plurality of substituents may be the same as or different from one another.

$G^x$ represents an organic group selected from the group consisting of a divalent aliphatic hydrocarbon group of 1 to 30 carbon atoms optionally having a substituent; and a group in which one or more of —$CH_2$— groups contained in a divalent aliphatic hydrocarbon group of 3 to 30 carbon atoms optionally having a substituent are substituted with —O—, —S—, —O—C(=O)—, —C(=O)—O—, —O—C(=O)—O—, —$NR^{14}$—C(=O)—, —C(=O)—$NR^{14}$—, —$NR^{14}$—, or —C(=O)— (except for cases where two or more —O—'s or two or more —S—'s are adjacently interposed). $R^{14}$ represents a hydrogen atom or an alkyl group of 1 to 6 carbon atoms. The "divalent aliphatic hydrocarbon group" is preferably a divalent chain aliphatic hydrocarbon group, and more preferably an alkylene group.

$Y^x$ represents a group selected from the group consisting of —O—, —C(=O)—, —S—, —C(=O)—O—, —O—C(=O)—, —O—C(=O)—O—, —C(=O)—S—, —S—C(=O)—, —$NR^{15}$—C(=O)—, —C(=O)—$NR^{15}$—, —O—C(=O)—$NR^{15}$—, —$NR^{15}$—C(=O)—O—, —N=N—, and —C≡C—. $R^{15}$ represents a hydrogen atom or an alkyl group of 1 to 6 carbon atoms. Among these, as $Y^x$, —O—, —O—C(=O)—O—, and —C(=O)—O— are preferable.

$F^x$ represents an organic group of at least one of an aromatic hydrocarbon ring and an aromatic heterocyclic ring. The number of carbon atoms of the organic group is preferably 2 or more, more preferably 7 or more, still more preferably 8 or more, and particularly preferably 10 or more, and is preferably 30 or less. The number of carbon atoms of the aforementioned organic group does not include carbon atoms of the substituent. Specific examples of F* may include the same examples as the specific examples of $R^h$ which will be described later.

$R^h$ represents an organic group having one or more aromatic rings selected from the group consisting of an aromatic hydrocarbon ring of 6 to 30 carbon atoms and an aromatic heterocyclic ring of 2 to 30 carbon atoms.

Preferable examples of $R^h$ may include a (1) hydrocarbon ring group of 6 to 40 carbon atoms having one or more aromatic hydrocarbon rings each having 6 to 30 carbon atoms. The hydrocarbon ring group having an aromatic hydrocarbon ring may hereinafter be referred to as "(1) hydrocarbon ring group" as appropriate. Specific examples of the (1) hydrocarbon ring group may include the following groups:

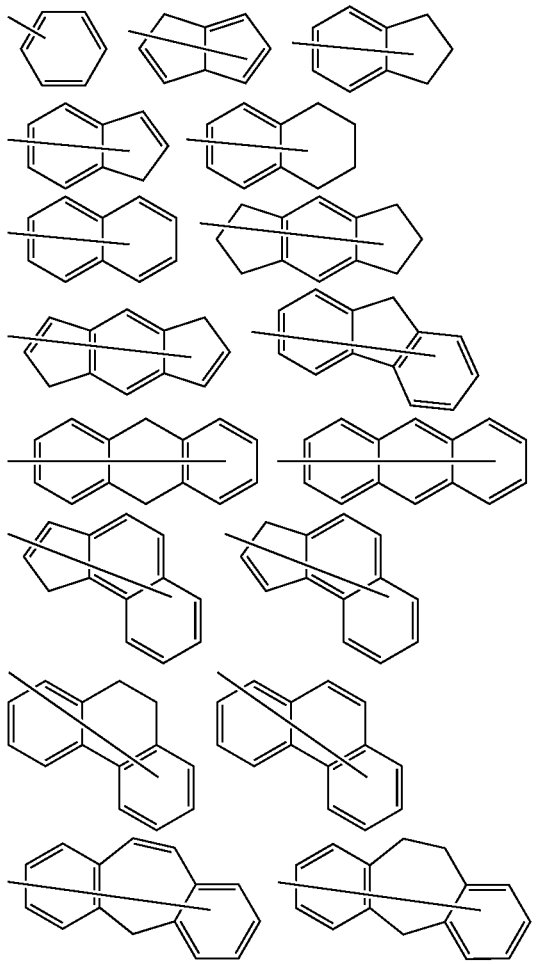

The (1) hydrocarbon ring group may have a substituent. Examples of the substituent that the (1) hydrocarbon ring group may have may include a halogen atom such as a fluorine atom and a chlorine atom; a cyano group; an alkyl group of 1 to 6 carbon atoms such as a methyl group, an ethyl group, and a propyl group; an alkenyl group of 2 to 6 carbon atoms such as a vinyl group and an allyl group; an alkyl halide group of 1 to 6 carbon atoms such as a trifluoromethyl group; an N,N-dialkylamino group of 2 to 12 carbon atoms such as a dimethylamino group; an alkoxy group of 1 to 6 carbon atoms such as a methoxy group, an ethoxy group, and an isopropoxy group; a nitro group; an aromatic hydrocarbon ring group such as a phenyl group and a naphthyl group; —OCF$_3$; —C(=O)—R$^b$; —O—C(=O)—R$^b$; —C(=O)—O—R$^b$; and —SO$_2$R$^a$. The meanings of R$^a$ and R$^b$ are as described above. Among these, a halogen atom, a cyano group, an alkyl group of 1 to 6 carbon atoms, and an alkoxy group of 1 to 6 carbon atoms are preferable. The number of substituents may be one or plural. The plurality of substituents may be the same as or different from one another.

Other preferable examples of $R^h$ may include a (2) heterocyclic ring group of 2 to 40 carbon atoms having one or more aromatic rings selected from the group consisting of an aromatic hydrocarbon ring of 6 to 30 carbon atoms and an aromatic heterocyclic ring of 2 to 30 carbon atoms. This heterocyclic ring group having an aromatic ring is hereinafter referred to as "(2) heterocyclic ring group" as appropriate. Specific examples of the (2) heterocyclic ring group may include the following groups. Each of R's independently represents a hydrogen atom or an alkyl group of 1 to 6 carbon atoms.

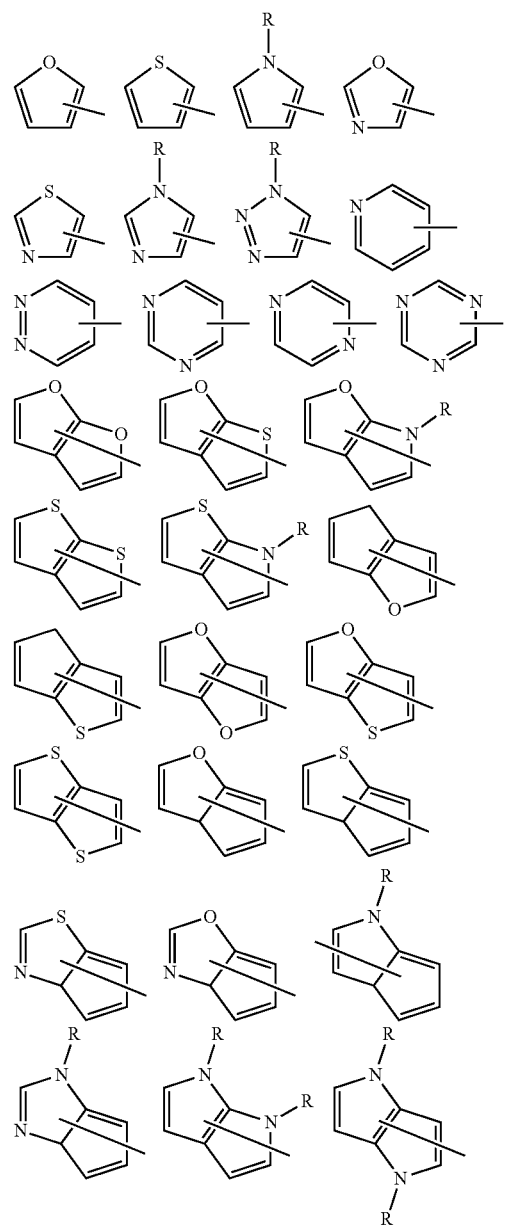

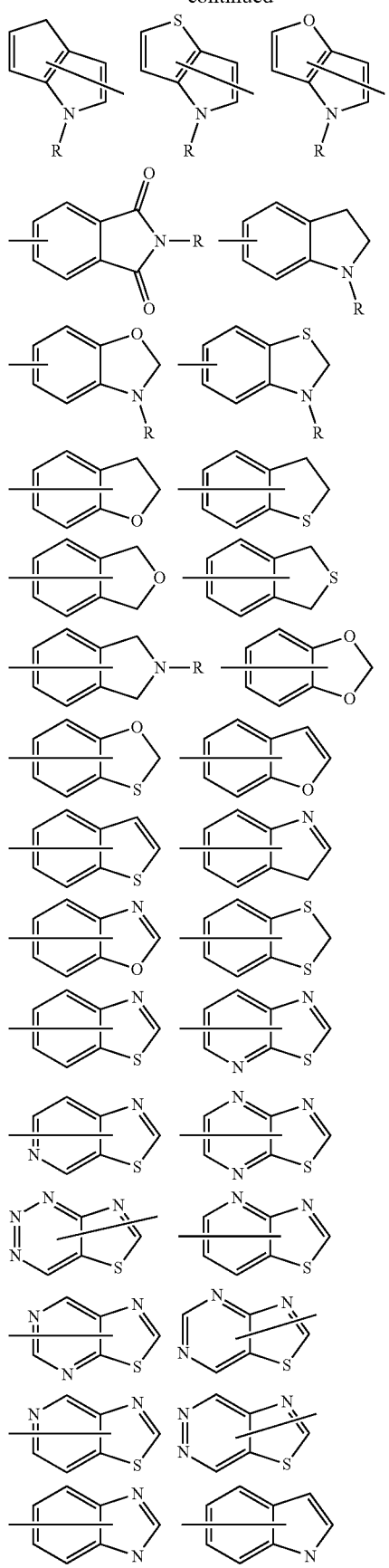
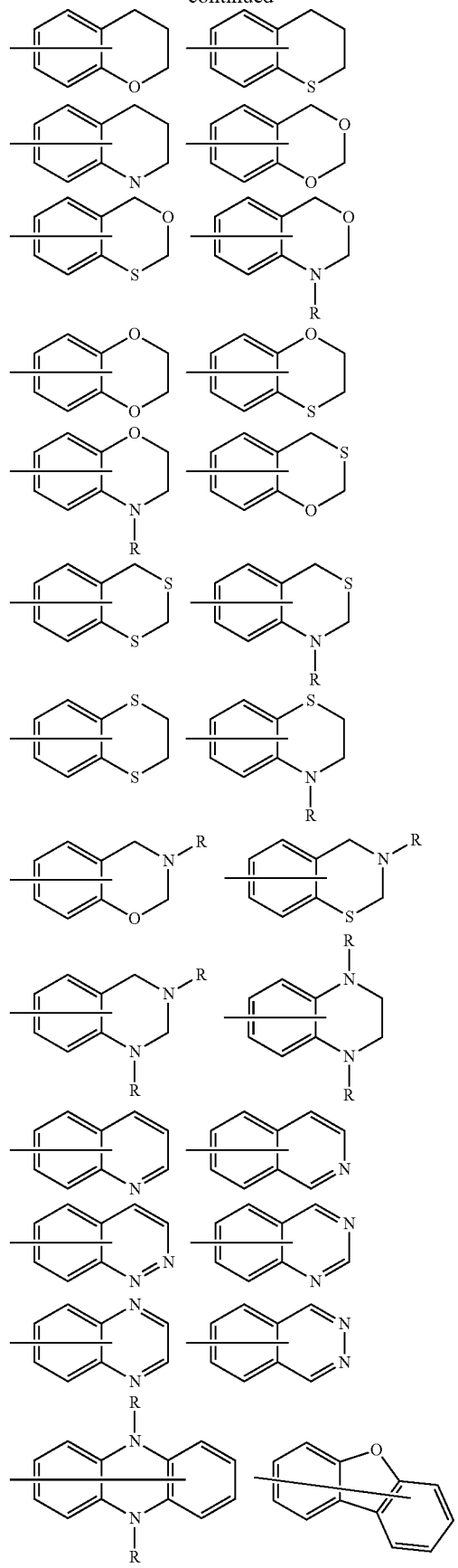

-continued
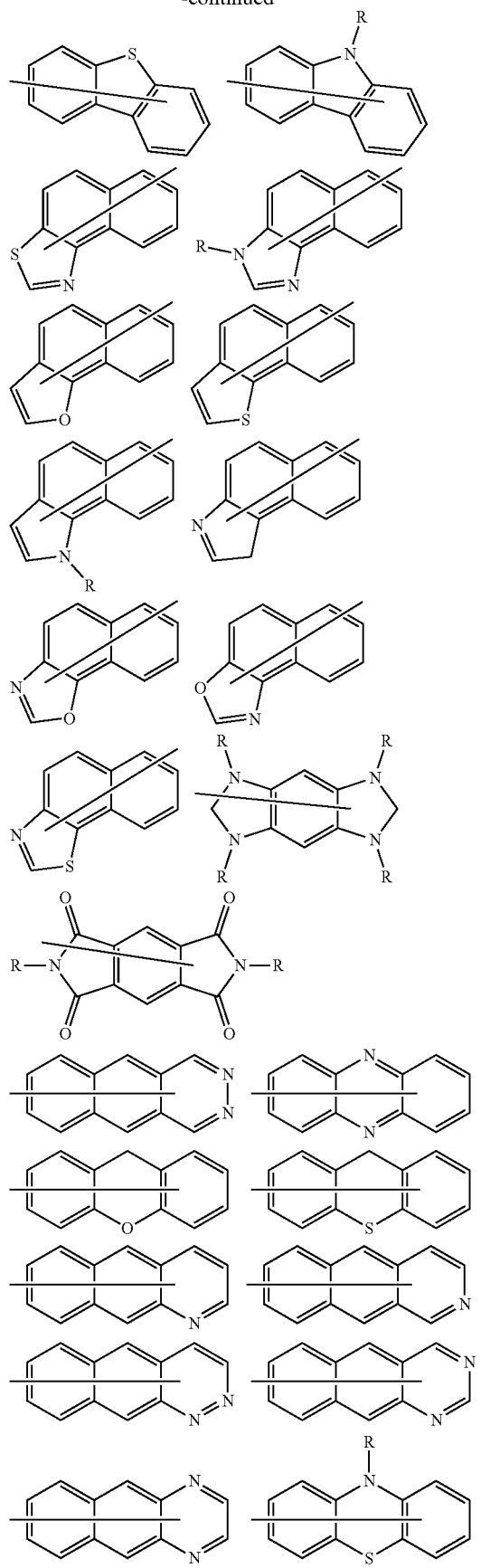
-continued
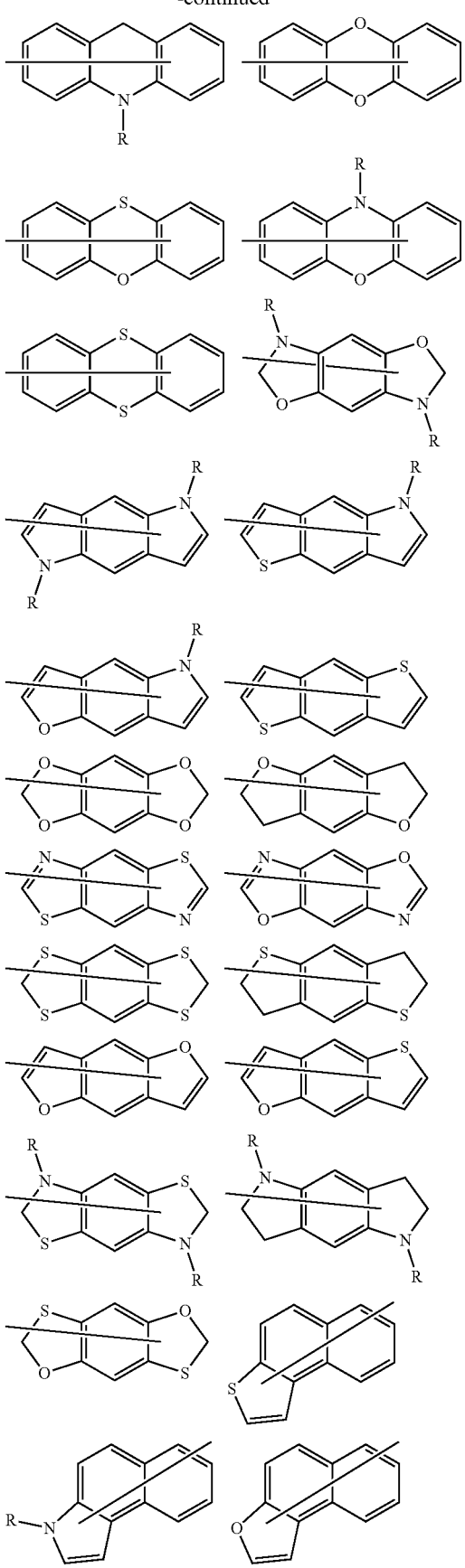

-continued

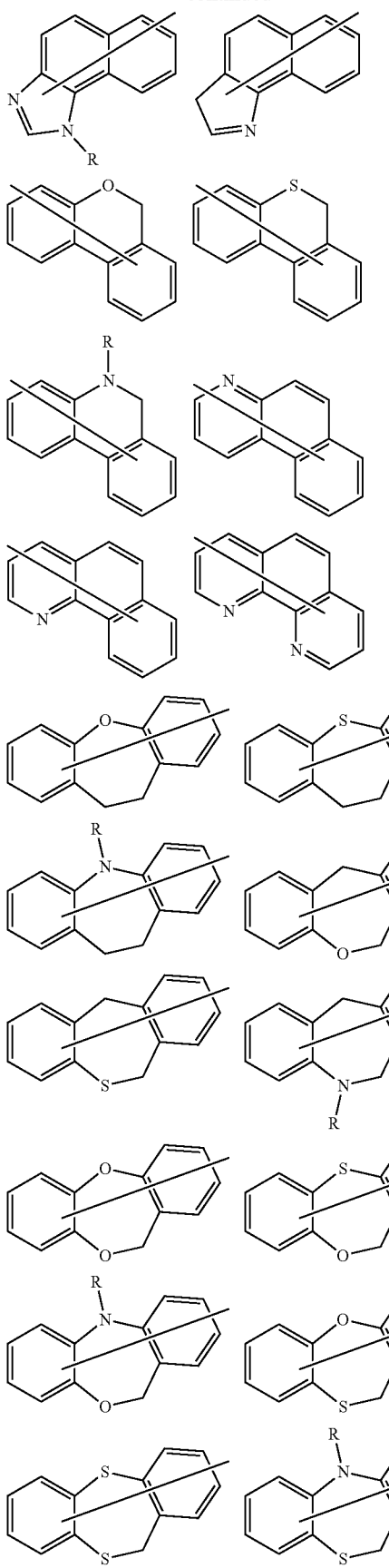

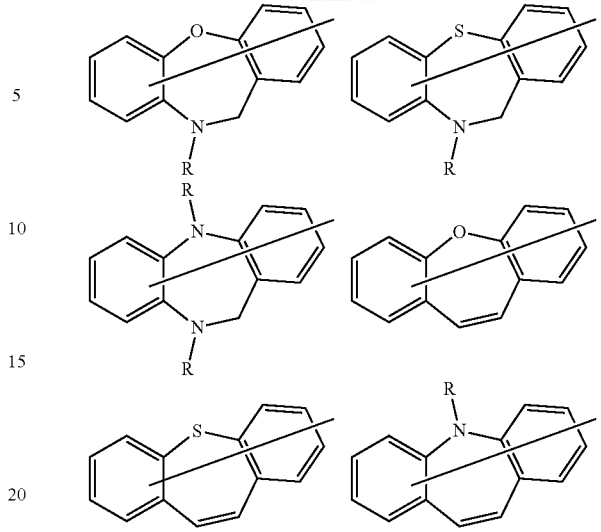

The (2) heterocyclic ring group may have a substituent. Examples of the substituents that the (2) heterocyclic ring group may have may include the same examples as those of the substituent that the (1) hydrocarbon ring group may have. The number of substituents may be one or plural. The plurality of substituents may be the same as or different from one another.

Still other preferable examples of $R^h$ may include an (3) alkyl group of 1 to 12 carbon atoms substituted with one or more groups selected from the group consisting of an aromatic hydrocarbon ring group of 6 to 30 carbon atoms and an aromatic heterocyclic ring group of 2 to 30 carbon atoms. This substituted alkyl group may hereinafter be referred to as "(3) substituted alkyl group" as appropriate.

Examples of the "alkyl group of 1 to 12 carbon atoms" in the (3) substituted alkyl group may include a methyl group, an ethyl group, a propyl group, and an isopropyl group.

Examples of the "aromatic hydrocarbon ring group of 6 to 30 carbon atoms" in the (3) substituted alkyl group may include the same examples as those of the aromatic hydrocarbon ring group of 6 to 30 carbon atoms in $D^1$ to $D^3$.

Examples of the "aromatic heterocyclic ring group of 2 to 30 carbon atoms" in the (3) substituted alkyl group may include the same examples as those of the aromatic heterocyclic ring group of 2 to 30 carbon atoms in $D^1$ to $D^3$.

The (3) substituted alkyl group may further have a substituent. Examples of the substituent that the (3) substituted alkyl group may have may include the same examples as those of the substituent that the (1) hydrocarbon ring group may have. The number of substituents may be one or plural. The plurality of substituents may be the same as or different from one another.

Still other preferable examples of $R^h$ may include an (4) alkenyl group of 2 to 12 carbon atoms substituted with one or more groups selected from the group consisting of an aromatic hydrocarbon ring group of 6 to 30 carbon atoms and an aromatic heterocyclic ring group of 2 to 30 carbon atoms. This substituted alkenyl group may hereinafter be referred to as "(4) substituted alkenyl group" as appropriate.

Examples of the "alkenyl group of 2 to 12 carbon atoms" in the (4) substituted alkenyl group may include a vinyl group and an allyl group.

Examples of the "aromatic hydrocarbon ring group of 6 to 30 carbon atoms" in the (4) substituted alkenyl group may include the same examples as those of the aromatic hydrocarbon ring group of 6 to 30 carbon atoms in $D^1$ to $D^3$. Examples of the "aromatic heterocyclic ring group of 2 to 30 carbon atoms" in the (4) substituted alkenyl group may include the same examples as those of the aromatic heterocyclic ring group of 2 to 30 carbon atoms in $D^1$ to $D^3$.

The (4) substituted alkenyl group may further have a substituent. Examples of the substituent that the (4) substituted alkenyl group may have may include the same examples as those of the substituent that the (1) hydrocarbon ring group may have. The number of substituents may be one or plural. The plurality of substituents may be the same as or different from one another.

Still other preferable examples of $R^h$ may include an (5) alkynyl group of 2 to 12 carbon atoms substituted with one or more groups selected from the group consisting of an aromatic hydrocarbon ring group of 6 to 30 carbon atoms and an aromatic heterocyclic ring group of 2 to 30 carbon atoms. This substituted alkynyl group may hereinafter be referred to as "(5) substituted alkynyl group" as appropriate.

Examples of the "alkynyl group of 2 to 12 carbon atoms" in the (5) substituted alkynyl group may include an ethynyl group and a propynyl group.

Examples of the "aromatic hydrocarbon ring group of 6 to 30 carbon atoms" in the (5) substituted alkynyl group may include the same examples as those of the aromatic hydrocarbon ring group of 6 to 30 carbon atoms in $D^1$ to $D^3$.

Examples of the "aromatic heterocyclic ring group of 2 to 30 carbon atoms" in the (5) substituted alkynyl group may include the same examples as those of the aromatic heterocyclic ring group of 2 to 30 carbon atoms in $D^1$ to $D^3$.

The (5) substituted alkynyl group may further have a substituent. Examples of the substituent that the (5) substituted alkynyl group may have may include the same examples as those of the substituent that the (1) hydrocarbon ring group may have. The number of substituents may be one or plural. The plurality of substituents may be the same as or different from one another.

Preferable specific examples of $R^h$ may include the following groups.

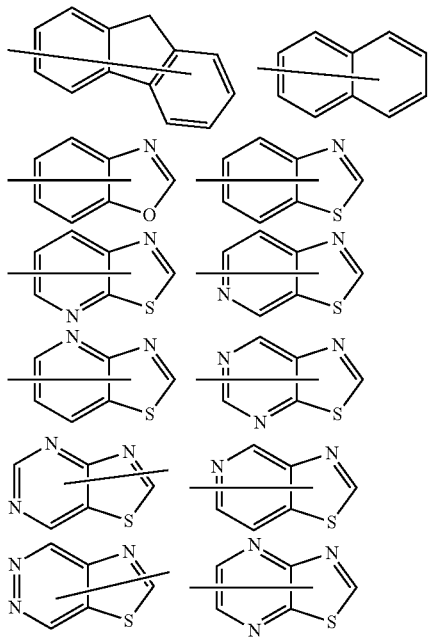

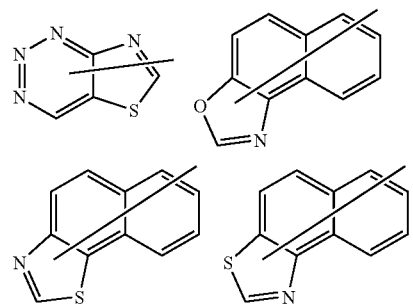

Further preferable specific examples of $R^h$ may include the following groups.

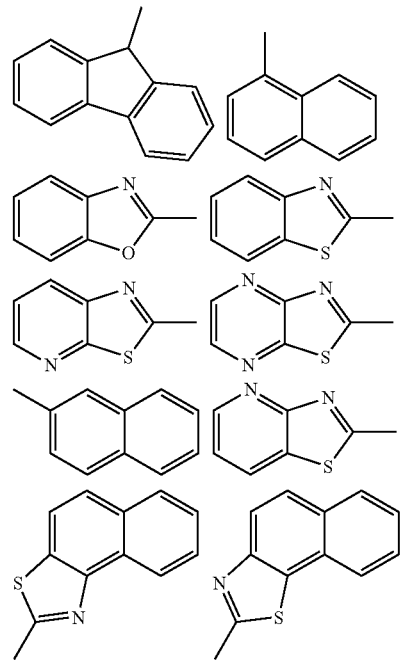

Particularly preferable specific examples of $R^h$ may include the following groups.

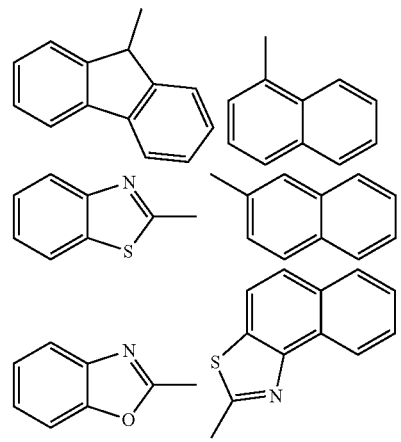

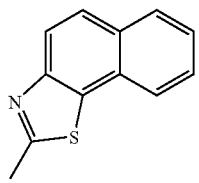

Specific examples of the above-mentioned $R^h$ may further have a substituent. Examples of the substituents may include a halogen atom such as a fluorine atom and a chlorine atom; a cyano group; an alkyl group of 1 to 6 carbon atoms such as a methyl group, an ethyl group, and a propyl group; an alkenyl group of 2 to 6 carbon atoms such as a vinyl group and an allyl group; an alkyl halide group of 1 to 6 carbon atoms such as a trifluoromethyl group; an N,N-dialkylamino group of 2 to 12 carbon atoms such as a dimethylamino group; an alkoxy group of 1 to 6 carbon atoms such as a methoxy group, an ethoxy group, and an isopropoxy group; a nitro group; —$OCF_3$; —C(=O)—$R^b$; —O—C(=O)—$R^b$; —C(=O)—O—$R^b$; and —$SO_2R^a$. The meanings of $R^a$ and $R^b$ are as described above. Among these, a halogen atom, a cyano group, an alkyl group of 1 to 6 carbon atoms, and an alkoxy group of 1 to 6 carbon atoms are preferable. The number of substituents may be one or plural. The plurality of substituents may be the same as or different from one another.

$R^1$ represents an organic group having one or more aromatic rings selected from the group consisting of an aromatic hydrocarbon ring of 6 to 30 carbon atoms and an aromatic heterocyclic ring of 2 to 30 carbon atoms.

Preferable examples of $R^1$ may include a hydrocarbon ring group of 6 to 40 carbon atoms having one or more aromatic hydrocarbon rings each having 6 to 30 carbon atoms.

Other preferable examples of $R^i$ may include a heterocyclic ring group of 2 to 40 carbon atoms having one or more aromatic rings selected from the group consisting of an aromatic hydrocarbon ring of 6 to 30 carbon atoms and an aromatic heterocyclic ring of 2 to 30 carbon atoms.

Particularly preferable examples of $R^i$ may include the following groups. The meaning of R is as described above.

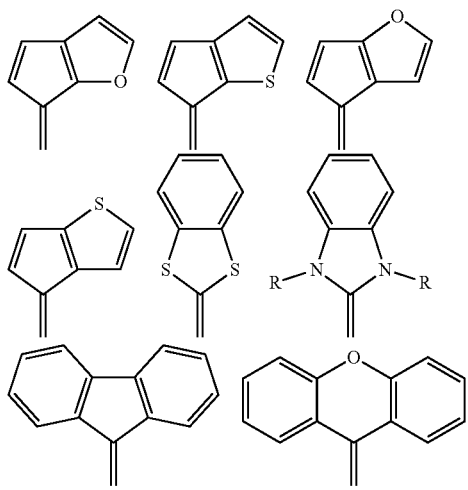

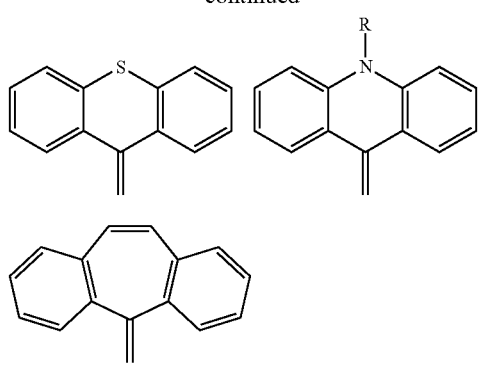

The group represented by any of the formulae (II-1) to (II-7) may further have a substituent other than $D^1$ to $D^6$. Examples of the substituent may include a halogen atom, a cyano group, a nitro group, an alkyl group of 1 to 6 carbon atoms, an alkyl halide group of 1 to 6 carbon atoms, an N-alkylamino group of 1 to 6 carbon atoms, an N,N-dialkylamino group of 2 to 12 carbon atoms, an alkoxy group of 1 to 6 carbon atoms, an alkyl sulfinyl group of 1 to 6 carbon atoms, a carboxyl group, a thioalkyl group of 1 to 6 carbon atoms, an N-alkylsulfamoyl group of 1 to 6 carbon atoms, and an N,N-dialkylsulfamoyl group of 2 to 12 carbon atoms. The number of substituents may be one or plural. The plurality of substituents may be the same as or different from one another.

Preferable examples of Ar in the formula (I) may include groups represented by the following formulae (III-1) to (III-10). The groups represented by the formulae (III-1) to (III-10) may have an alkyl group of 1 to 6 carbon atoms as a substituent. In the following formula, the symbol "*" represents a position for bonding.

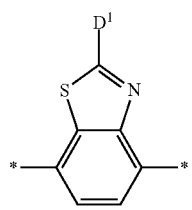
(III-1)

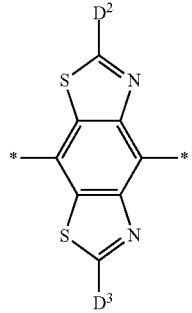
(III-2)

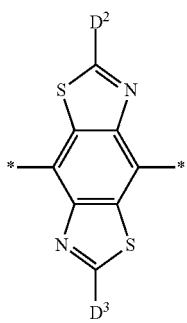 (III-3)
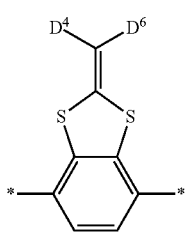 (III-4)
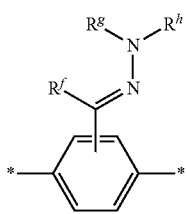 (III-5)
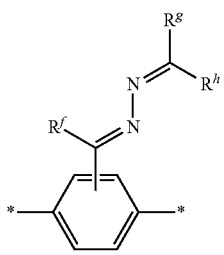 (III-6)
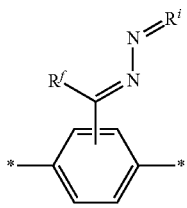 (III-7)
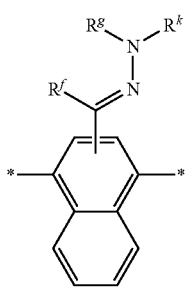 (III-8)
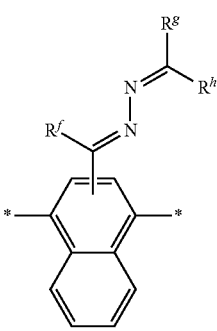 (III-9)
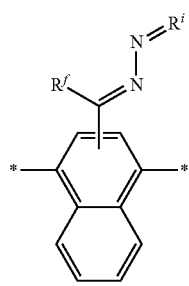 (III-10)
Particularly preferable specific examples of the formulae (III-1) and (III-4) may include the following groups. In the following formula, the symbol "*" represents a position for bonding.
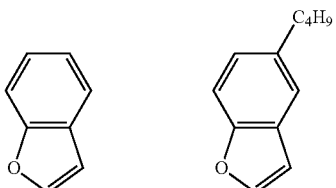
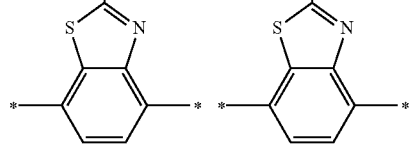
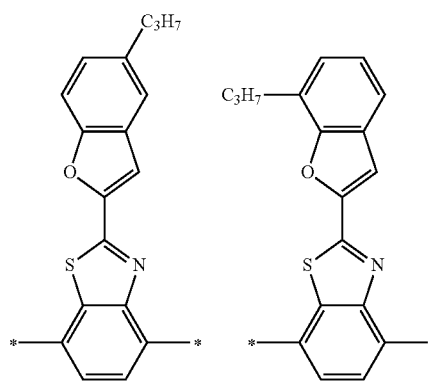

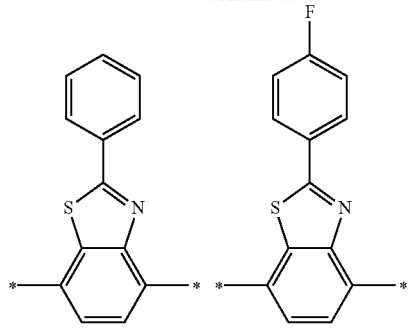
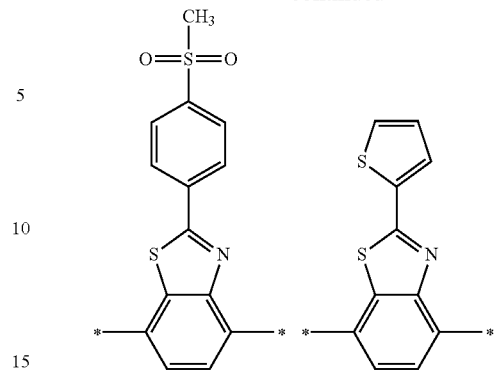
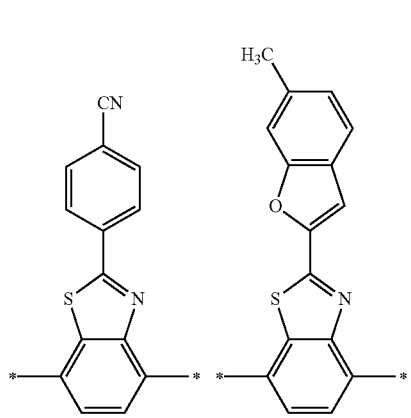
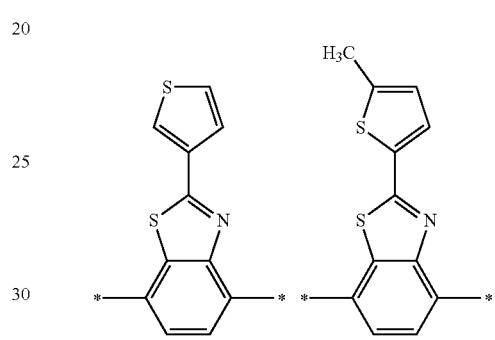
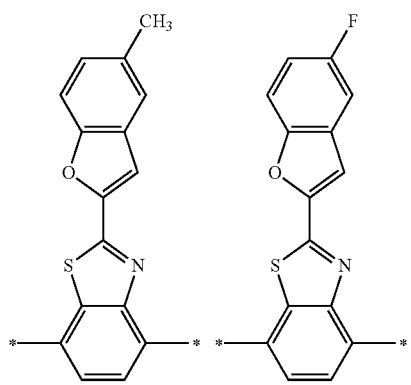
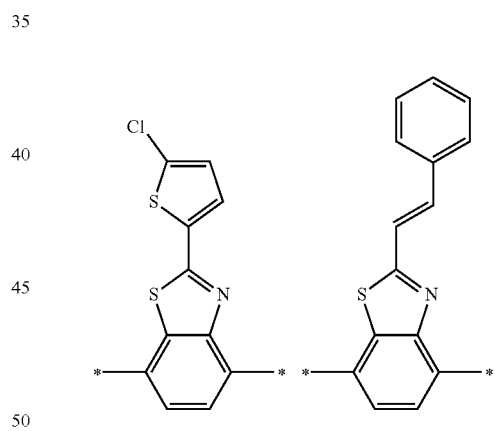
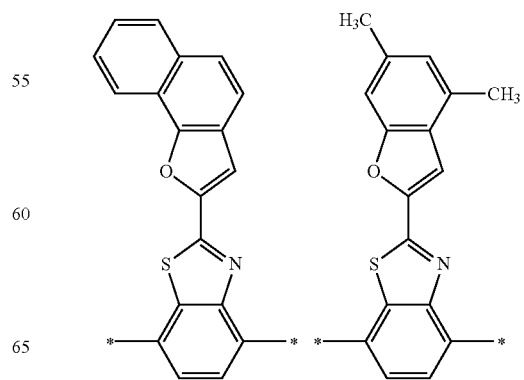

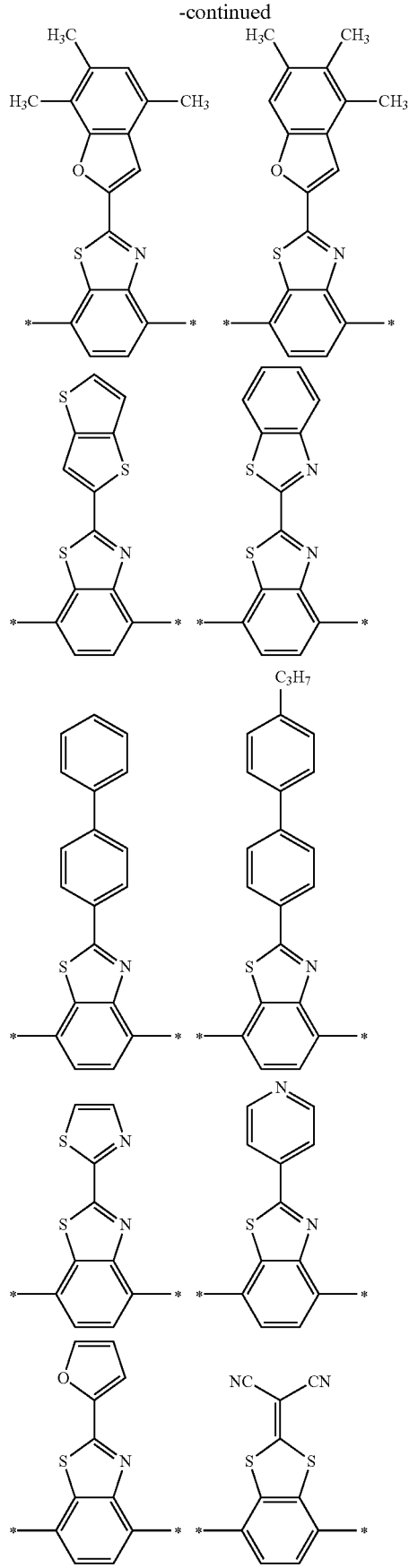
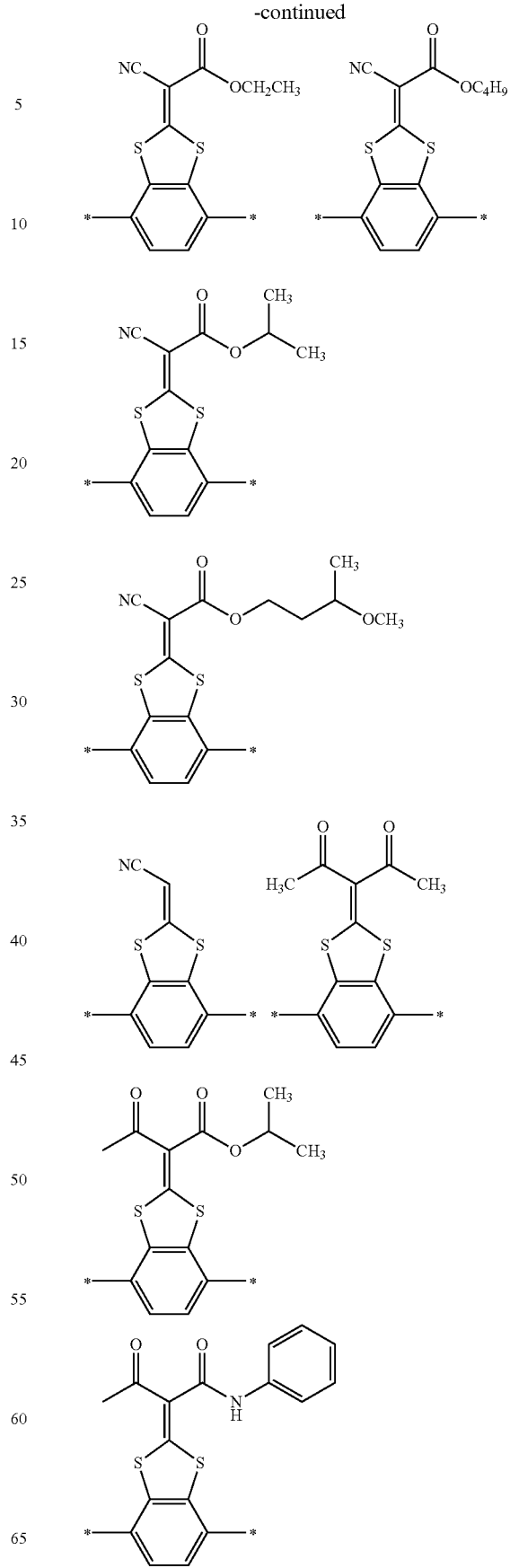

-continued

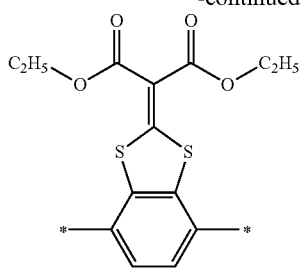

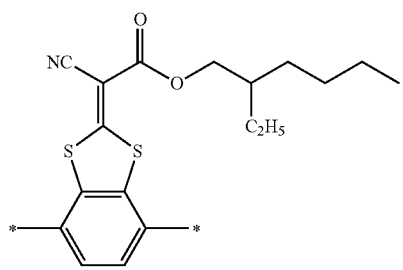

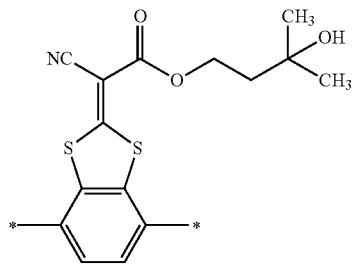

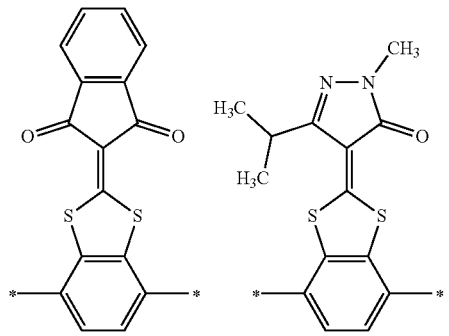

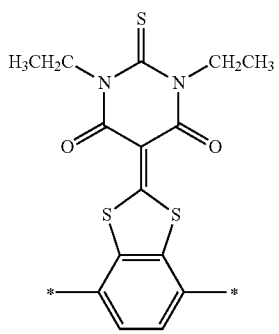

-continued

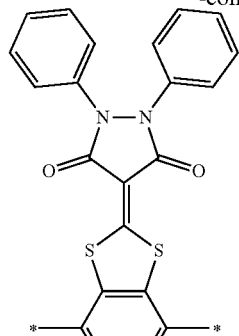

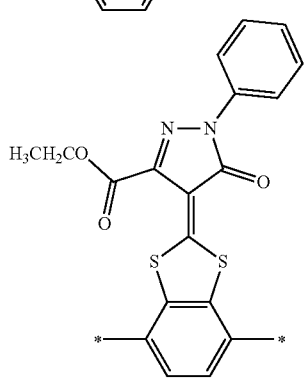

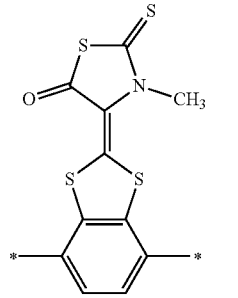

In the formula (I), each of $Z^1$ and $Z^2$ independently represents one selected from the group consisting of a single bond, —O—, —O—$CH_2$—, —$CH_2$—O—, —O—$CH_2$—$CH_2$—, —$CH_2$—$CH_2$—O—, —C(=O)—O—, —O—C(=O)—, —C(=O)—S—, —S—C(=O)—, —$NR^{21}$—C(=O)—, —C(=O)—$NR^{21}$—, —$CF_2$—O—, —O—$CF_2$—, —$CH_2$—$CH_2$—, —$CF_2$—$CF_2$—, —O—$CH_2$—$CH_2$—O—, —CH=CH—C(=O)—O—, —O—C(=O)—CH=CH—, —$CH_2$—C(=O)—O—, —O—C(=O)—$CH_2$—, —$CH_2$—O—C(=O)—, —C(=O)—O—$CH_2$—, —$CH_2$—$CH_2$—C(=O)—O—, —O—C(=O)—$CH_2$—$CH_2$—, —$CH_2$—$CH_2$—O—C(=O)—, —C(=O)—O—$CH_2$—$CH_2$—, —CH=CH—, —N=CH—, —CH=N—, —N=C(CH_3)—, —C(CH_3)=N—, —N=N—, and —C≡C—. Each of $R^{21}$'s independently represents a hydrogen atom or an alkyl group of 1 to 6 carbon atoms.

In the formula (I), each of $A^1$, $A^2$, $B^1$, and $B^2$ independently represents a group selected from the group consisting of a cyclic aliphatic group optionally having a substituent, and an aromatic group optionally having a substituent. Usually the number of carbon atoms of each of the groups represented by $A^1$, $A^2$, $B^1$, and $B^2$ (including the number of carbon atoms of the substituent) is independently 3 to 100. Among these, each of $A^1$, $A^2$, $B^1$, and $B^2$ is independently a cyclic aliphatic group of 5 to 20 carbon atoms optionally having a substituent, or an aromatic group of 2 to 20 carbon atoms optionally having a substituent.

Examples of the cyclic aliphatic groups in $A^1$, $A^2$, $B^1$ and $B^2$ may include a cycloalkanediyl group of 5 to 20 carbon atoms such as a cyclopentane-1,3-diyl group, a cyclohexane-1,4-diyl group, a 1,4-cycloheptane-1,4-diyl group, and a cyclooctane-1,5-diyl group; and a bicycloalkanediyl group of 5 to 20 carbon atoms such as a decahydronaphthalene-1,5-diyl group and a decahydronaphthalene-2,6-diyl group. Among these, an optionally substituted cycloalkanediyl group of 5 to 20 carbon atoms is preferable, a cyclohexanediyl group is more preferable, and a cyclohexane-1,4-diyl group is particularly preferable. The cyclic aliphatic group may be a trans-isomer, a cis-isomer, or a mixture of a cis-isomer and a trans-isomer. Among these, a trans-isomer is more preferable.

Examples of the substituents that the cyclic aliphatic groups in $A^1$, $A^2$, $B^1$, and $B^2$ may have may include a halogen atom, an alkyl group of 1 to 6 carbon atoms, an alkoxy group of 1 to 5 carbon atoms, a nitro group, and a cyano group. The number of substituents may be one or plural. The plurality of substituents may be the same as or different from one another.

Examples of the aromatic groups in $A^1$, $A^2$, $B^1$, and $B^2$ may include an aromatic hydrocarbon ring group of 6 to 20 carbon atoms such as a 1,2-phenylene group, a 1,3-phenylene group, a 1,4-phenylene group, a 1,4-naphthylene group, a 1,5-naphthylene group, a 2,6-naphthylene group, and a 4,4'-biphenylene group; and an aromatic heterocyclic ring group of 2 to 20 carbon atoms such as a furan-2,5-diyl group, a thiophene-2,5-diyl group, a pyridine-2,5-diyl group, and a pyrazine-2,5-diyl group. Among these, an aromatic hydrocarbon ring group of 6 to 20 carbon atoms is preferable, a phenylene group is more preferable, and a 1,4-phenylene group is particularly preferable.

Examples of the substituent that the aromatic groups in $A^1$, $A^2$, $B^1$ and $B^2$ may have may include the same examples as those of the substituent that the cyclic aliphatic groups in $A^1$, $A^2$, $B^1$ and $B^2$ may have. The number of substituents may be one or plural. The plurality of substituents may be the same as or different from one another.

In the formula (I), each of $Y^1$ to $Y^4$ independently represents one selected from the group consisting of a single bond, —O—, —C(=O)—, —C(=O)—O—, —O—C(=O)—, —NR$^{22}$—C(=O)—, —C(=O)—NR$^{22}$—, —O—C(=O)—O—, —NR$^{22}$—C(=O)—O—, —O—C(=O)—NR$^{22}$—, and —NR$^{22}$—C(=O)—NR$^{23}$—. Each of $R^{22}$ and $R^{23}$ independently represents a hydrogen atom or an alkyl group of 1 to 6 carbon atoms.

In the formula (I), each of $G^1$ and $G^2$ independently represents an organic group selected from the group consisting of an aliphatic hydrocarbon group of 1 to 20 carbon atoms; and a group in which one or more of the methylene groups (—CH$_2$—) contained in the aliphatic hydrocarbon group of 3 to 20 carbon atoms is substituted with —O— or —C(=O)—. The hydrogen atom contained in the organic group of $G^1$ and $G^2$ may be substituted with an alkyl group of 1 to 5 carbon atoms, an alkoxy group of 1 to 5 carbon atoms, or a halogen atom. However, the methylene groups (—CH$_2$—) at both ends of $G^1$ and $G^2$ are not substituted with —O— or —C(=O)—.

Specific examples of the aliphatic hydrocarbon group of 1 to 20 carbon atoms in $G^1$ and $G^2$ may include an alkylene group of 1 to 20 carbon atoms.

Specific examples of the aliphatic hydrocarbon group of 3 to 20 carbon atoms in $G^1$ and $G^2$ may include an alkylene group of 3 to 20 carbon atoms.

In the formula (I), each of $P^1$ and $P^2$ independently represents a polymerizable functional group. Examples of the polymerizable functional groups for $P^1$ and $P^2$ may include a group represented by $CH_2=CR^{31}$—C(=O)—O— such as an acryloyloxy group and a methacryloyloxy group; a vinyl group; a vinyl ether group; a p-stilbene group; an acryloyl group; a methacryloyl group; a carboxyl group; a methylcarbonyl group; a hydroxyl group; an amido group; an alkylamino group of 1 to 4 carbon atoms; an amino group; an epoxy group; an oxetanyl group; an aldehyde group; an isocyanate group; and a thioisocyanate group. $R^{31}$ represents a hydrogen atom, a methyl group, or a chlorine atom. Among these, a group represented by $CH_2=CR^{31}$—C(=O)—O— is preferable, $CH_2$=CH—C(=O)—O— (an acryloyloxy group) and $CH_2$=C(CH$_3$)—C(=O)—O— (a methacryloyloxy group) are more preferable, and an acryloyloxy group is particularly preferable.

In the formula (I), each of p and q independently represents 0 or 1.

The polymerizable liquid crystal compound represented by the formula (I) may be produced by, for example, a reaction between a hydrazine compound and a carbonyl compound as described in International Publication No. 2012/147904.

The ratio of the polymerizable liquid crystal compound in the liquid crystal composition is preferably 10% by weight or more, more preferably 15% by weight or more, and particularly preferably 18% by weight or more, and is preferably 45% by weight or less, more preferably 40% by weight or less, and particularly preferably 30% by weight or less.

[2.2. Copolymer (Orientation Aid)]

The orientation aid is a copolymer that contains specific monomer units A and B in combination.

The monomer unit A includes a monovalent group containing an aromatic ring. This monovalent group is usually bonded as a side chain to the main chain of the copolymer that serves as an orientation aid. Therefore, in the following description, this "monovalent group containing an aromatic ring" is sometimes appropriately referred to as a "side chain group A".

Examples of the aromatic ring contained in the side chain group A of the monomer unit A may include an aromatic hydrocarbon ring such as a benzene ring, a naphthalene ring, and an anthracene ring. Among these, a benzene ring is preferable. By using a benzene ring, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

The number of aromatic rings contained in one side chain group A of the monomer unit A may be one, and may also be two or more. Especially, the number of aromatic rings possessed by one side chain group A is preferably 2 to 6, particularly preferably 2 to 4. When the number of aromatic rings possessed by one side chain group A falls within aforementioned range, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

It is preferable that the manner of bonding of the aromatic ring contained in the side chain group A of the monomer unit A to the main chain of the copolymer that serves as an orientation aid is not a direct bond but a bond via an appropriate linking group. Therefore, the side chain group A preferably contains an aromatic ring and a linking group that links this aromatic ring with the main chain of the monomer unit A. Also, the linking group preferably contains a hetero atom such as an oxygen atom. Particularly suitable examples of the linking group may include a linking group containing a —COO— group. In such a case, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

The number of carbon atoms of the side chain group A of the monomer unit A is preferably 8 or more, more preferably 10 or more, and particularly preferably 12 or more, and is preferably 32 or less, more preferably 28 or less, and particularly preferably 24 or less. When the number of carbon atoms of the side chain group A falls within the aforementioned range, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

The molecular weight of the side chain group A of the monomer unit A is preferably 150 or more, more preferably 200 or more, and particularly preferably 250 or more, and is preferably 800 or less, more preferably 700 or less, and particularly preferably 600 or less. When the molecular weight of the side chain group A falls within the aforementioned range, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

Particularly preferable examples of the monomer unit A may include a monomer unit represented by the following formula (A).

(A)

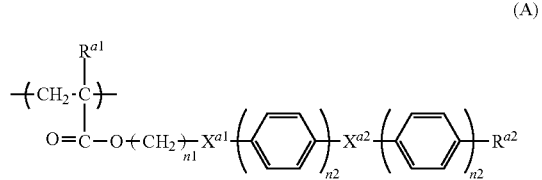

(In the foregoing formula (A), $R^{a1}$ represents a hydrogen atom or a methyl group, each of $X^{a1}$ and $X^{a2}$ independently represents a divalent linking group, $R^{a2}$ represents at least one selected from the group consisting of an alkyl group of 1 to 6 carbon atoms, an alkoxy group of 1 to 6 carbon atoms, a halogen atom, a cyano group, and an isocyanate group (a —N═C═O group), n1 represents an integer of 1 to 14, n2 represents an integer of 1 or 2, and n3 represents an integer of 1 or 2.)

In the monomer unit represented by the formula (A), a monovalent group surrounded by a broken line in the following formula corresponds to the side chain group A.

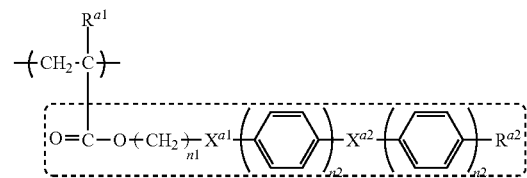

In the foregoing formula (A), $R^{a1}$ represents a hydrogen atom or a methyl group. Among these, a methyl group is preferable as $R^{a1}$. By using a methyl group, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

In the forgoing formula (A), $X^{a1}$ represents a divalent linking group. Examples of $X^{a1}$ may include —O—, —C(═O)—, —C(═O)—O—, —O—C(═O)—, —O—C(═O)—O—, —N═N—, —N═CH—, —C(═O)—NH—, and —C≡C—. Among these, —O— is preferable. By using —O—, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

In the foregoing formula (A), $X^{a2}$ represents a divalent linking group. Examples of $X^{a2}$ may include —O—, —C(═O)—, —C(═O)—O—, —O—C(═O)—, —O—C(═O)—O—, —N═N—, —N═CH—, —C(═O)—NH—, and —C≡C—. Among these, —C(═O)—O— and —O—C(═O)— are preferable, and —C(═O)—O— is particularly preferable. By using the above-mentioned preferable linking group as $X^{a2}$, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

In the foregoing formula (A), $R^{a2}$ represents at least one selected from the group consisting of an alkyl group of 1 to 6 carbon atoms, an alkoxy group of 1 to 6 carbon atoms, a halogen atom, a cyano group, and an isocyanate group. Examples of the alkyl group may include a methyl group, an ethyl group, and a propyl group. Examples of the alkoxy group may include a methoxy group, an ethoxy group, and a propoxy group. Examples of the halogen atom may include a fluorine atom, and a chlorine atom. Among these, an alkoxy group is preferable, and a methoxy group is particularly preferable. In such a case, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

In the foregoing formula (A), n1 represents an integer of 1 to 14. Among these, n1 is preferably 2 or more, and more preferably 3 or more, and is preferably 14 or less, more preferably 12 or less, and particularly preferably 10 or less. When n1 falls within the aforementioned range, the tilt angle formed by the main chain mesogen of the polymerizable liquid crystal compound with respect to the layer plane of the liquid crystal cured layer can be effectively increased.

Furthermore, usually the orientation properties of the liquid crystal cured layer can be made favorable.

In the formula (A), n2 represents an integer of 1 or 2.
In the formula (A), n3 represents an integer of 1 or 2.
Examples of the monomer unit A represented by the formula (A) may include a monomer unit represented by the following formula (A-1).

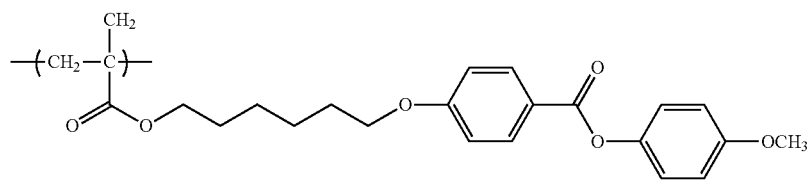

(A-1)

The monomer unit B contains a monovalent aliphatic hydrocarbon group optionally having a substituent. Therefore, a monovalent group containing the monovalent aliphatic hydrocarbon group is bonded as a side chain to the main chain of the copolymer that serves as the orientation aid. In the following description, the "monovalent group containing a monovalent aliphatic hydrocarbon group optionally having a substituent" may be referred to as a "side chain group B" as appropriate.

The monovalent aliphatic hydrocarbon group contained in the monomer unit B is preferably a chain aliphatic hydrocarbon group. The monovalent aliphatic hydrocarbon group is preferably a saturated aliphatic hydrocarbon group. Among these, the monovalent aliphatic hydrocarbon group is preferably an alkyl group. In such a case, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

The number of carbon atoms of the monovalent aliphatic hydrocarbon group contained in the monomer unit B is usually 1 to 30. Among these, the number of carbon atoms of the monovalent aliphatic hydrocarbon group is preferably 3 or more, more preferably 6 or more, and particularly preferably 7 or more, and is preferably 22 or less, more preferably 15 or less, and particularly preferably 10 or less. When the number of carbon atoms of the monovalent aliphatic hydrocarbon group falls within the aforementioned range, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

Examples of the monovalent aliphatic hydrocarbon groups contained in the monomer unit B may include an alkyl group such as a methyl group, an ethyl group, a hexyl group, a heptyl group, an octyl group, a decyl group, and an icosyl group. Among these, a linear alkyl group having no branched chain is preferable. By using a linear alkyl group, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

In the monovalent aliphatic hydrocarbon group contained in the monomer unit B, the hydrogen atom of the aliphatic hydrocarbon group may be substituted with a substituent. Examples of the substituent may include a halogen atom such as a fluorine atom and a chlorine atom. The number of substituents may be one or two or more. The type of the substituent may be one type or two or more types. Among these, a halogen atom is preferable, and a fluorine atom is more preferable. Further, it is particularly preferable that a fluorine atom is bonded to at least the carbon atom at the terminal of the aliphatic hydrocarbon group. In such a case, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

It is preferable that the manner of bonding of the aliphatic hydrocarbon group of the monomer unit B to the main chain of the copolymer that serves as the orientation aid is not a direct bond but a bond via an appropriate linking group. Therefore, it is preferable that the side chain group B contains the aforementioned monovalent aliphatic hydrocarbon group optionally having a substituent, and a linking group which links the aliphatic hydrocarbon group and the main chain of the monomer unit B. The linking group preferably contains a heteroatom such as an oxygen atom. Examples of particularly suitable linking groups may include a linking group including a —COO— group. In such a case, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

It is preferable that the monomer unit B does not contain an aromatic ring. Therefore, it is preferable that the side chain group B does not contain an aromatic ring.

The number of carbon atoms of the side chain group B of the monomer unit B is preferably 3 or more, more preferably 5 or more, and particularly preferably 7 or more, and is preferably 16 or less, more preferably 14 or less, and particularly preferably 12 or less. When the number of carbon atoms of the side chain group B falls within the aforementioned range, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

The molecular weight of the side chain group B of the monomer unit B is preferably 250 or more, more preferably 300 or more, and particularly preferably 350 or more, and is preferably 800 or less, more preferably 700 or less, and particularly preferably 600 or less. When the molecular weight of the side group B falls within the aforementioned range, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

Particularly preferable examples of the monomer unit B may include a monomer unit represented by the following formula (B).

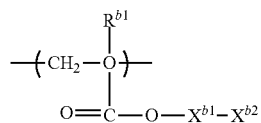
(B)

(In the foregoing formula (B), $R^{b1}$ represents a hydrogen atom or a methyl group, $X^{b1}$ represents a single bond or a divalent linking group, and $R^{b2}$ represents a monovalent aliphatic hydrocarbon group optionally having a substituent.)

In the monomer unit represented by the formula (B), a monovalent group surrounded by a broken line in the following formula corresponds to the side group B.

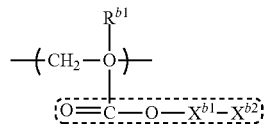

In the aforementioned formula (B), $R^{b1}$ represents a hydrogen atom or a methyl group. Among these, a methyl group is preferable as $R^{b1}$. By using a methyl group, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

In the foregoing formula (B), $X^{b1}$ represents a single bond or a divalent linking group. Examples of the divalent linking group may include —C(=O)—, —C(=O)—O—, —(CH$_2$CH$_2$C)$_{n4}$—. Herein, n4 represents an integer of 1 to 6. Among these, a single bond is preferable. When $X^{b1}$ is a single bond, the tilt angle formed by the main chain mesogen of the polymerizable liquid crystal compound with respect to the layer plane of the liquid crystal 5 cured layer can be effectively increased. Furthermore, usually the orientation properties of the liquid crystal cured layer can be made favorable.

In the foregoing formula (B), $R^{b2}$ represents a monovalent aliphatic hydrocarbon group optionally having a substituent. The range of the monovalent aliphatic hydrocarbon group optionally having a substituent is as described above.

Examples of the monomer unit B represented by the formula (B) may include a monomer unit represented by the following formula (B-1).

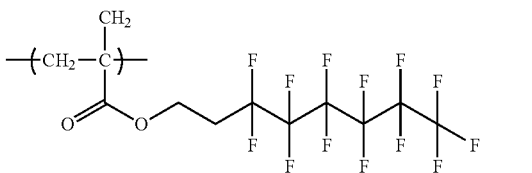
(B-1)

The molar ratio (monomer unit A:monomer unit B) of the monomer unit A relative to the monomer unit B contained in the copolymer that serves as an orientation aid is preferably 90:10 to 60:40, more preferably 85:15 to 65:35, and particularly preferably 80:20 to 70:30. When the molar ratio of the monomer unit A relative to the monomer unit B falls within the aforementioned range, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

The ratio of the sum of the monomer unit A and the monomer unit B in the copolymer that serves as an orientation aid is preferably 80% by weight to 100% by weight, more preferably 90% by weight and 100% by weight, and particularly preferably 95% by weight to 100% by weight. When the ratio of the monomer unit A and the monomer unit B to the copolymer that serves as an orientation aid is large as described above, the tilt angle formed by the main chain mesogen of the polymerizable liquid crystal compound with respect to the layer plane of the liquid crystal cured layer can be effectively increased. Furthermore, usually the orientation properties of the liquid crystal cured layer can be made favorable.

In a copolymer, the ratio of a monomer unit formed by polymerizing a monomer in the copolymer usually corresponds to the ratio of the monomer relative to the total monomers used for polymerization of the copolymer (charge ratio), unless otherwise specified. Thus, for example, the ratio of the monomer unit A in the copolymer usually coincides with the ratio of the monomer corresponding to the monomer unit A in the total monomers used for polymerization of the copolymer.

The copolymer that serves as an orientation aid may further contain an optional monomer unit in combination with the monomer unit A and the monomer unit B. However, from the viewpoint of effectively increasing the tilt angle of the main chain mesogen of the polymerizable liquid crystal compound with respect to the layer plane of the liquid crystal cured layer, it is preferable that the amount of the optional monomer units is small.

The weight-average molecular weight Mw of the copolymer that serves as an orientation aid is preferably 2,000 or more, more preferably 2,500 or more, and particularly preferably 3,000 or more, and is preferably 100,000 or less, more preferably 50,000 or less, and particularly preferably 30,000 or less. When the weight-average molecular weight Mw of the orientation aid falls within the aforementioned range, the tilt angle of the main chain mesogen of the polymerizable liquid crystal compound with respect to the layer plane of the liquid crystal cured layer can be effectively increased. Further, usually the orientation properties of the liquid crystal cured layer can be made favorable.

The weight-average molecular weight may be determined as a polyisoprene or polystyrene-equivalent value by gel permeation chromatography using tetrahydrofuran as the solvent (toluene may be used if the sample is not soluble in tetrahydrofuran).

The copolymer that serves as the above-mentioned orientation aid may be produced by a production method including a step of copolymerizing a monomer corresponding to the monomer unit A and a monomer corresponding to the monomer unit B. For example, the orientation aid containing the monomer unit A represented by the formula (A) and the monomer unit B represented by the formula (B) may be produced by a production method including a step of copolymerizing an acrylic or methacrylic monomer corresponding to the monomer unit A and an acrylic or methacrylic monomer corresponding to the monomer unit B.

The copolymerization may be performed by any optional polymerization method such as, for example, a radical polymerization method, a cationic polymerization method, an anionic polymerization method, or the like. In the copolymerization, a polymerization initiator is usually used. Examples of the polymerization initiator may include azobisisobutyronitrile, and benzoyl peroxide.

The amount of the orientation aid contained in the liquid crystal composition is preferably 1 part by weight or more, more preferably 2 parts by weight or more, and particularly preferably 3 parts by weight or more, and is preferably 10 parts by weight or less, more preferably 9 parts by weight or less, and particularly preferably 8 parts by weight or less, relative to 100 parts by weight of the polymerizable liquid crystal compound. When the amount of the orientation aid falls within the aforementioned range, the tilt angle formed by the main chain mesogen of the polymerizable liquid crystal compound with respect to the layer plane of the liquid crystal cured layer can be effectively increased. In particular, when the amount of the orientation aid is equal to or more than the lower limit value of the aforementioned range, orientation properties of the polymerizable liquid crystal compound can be improved, and thereby occurrence of orientation defects in the liquid crystal cured layer can be suppressed.

[2.3. Optional Component]

The liquid crystal composition may contain an optional component in combination with the polymerizable liquid crystal compound and the orientation aid. As the optional component, one type thereof may be solely used, and two or more types thereof may also be used in combination at any ratio.

As the optional component, for example, a polymerization initiator may be mentioned. Since polymerization of the polymerizable liquid crystal compound can be promoted by the polymerization initiator, curing of the liquid crystal composition can quickly proceed. The type of the polymerization initiator may be selected according to the type of the polymerizable liquid crystal compound contained in the liquid crystal composition. For example, if the polymerizable liquid crystal compound is radically polymerizable, a radical polymerization initiator may be used. If the polymerizable liquid crystal compound is anionically polymerizable, an anionic polymerization initiator may be used. Furthermore, if the polymerizable liquid crystal compound is cationically polymerizable, a cationic polymerization initiator may be used. As the polymerization initiator, one type thereof may be solely used, and two or more types thereof may also be used in combination at any ratio.

The amount of the polymerization initiator is preferably 0.1 part by weight or more, and more preferably 0.5 part by weight or more, and is preferably 30 parts by weight or less, and more preferably 10 parts by weight or less, relative to 100 parts by weight of the polymerizable liquid crystal compound. When the amount of the polymerization initiator falls within the aforementioned range, efficient proceeding of the polymerization can be achieved.

As the optional component, for example, a solvent may be mentioned. As the solvent, a solvent capable of dissolving the polymerizable liquid crystal compound is preferable. As such a solvent, an organic solvent is usually used. Examples of the organic solvent may include a ketone solvent such as cyclopentanone, cyclohexanone, methyl ethyl ketone, acetone, and methyl isobutyl ketone; an acetic acid ester solvent such as butyl acetate, and amyl acetate; a halogenated hydrocarbon solvent such as chloroform, dichloromethane, and dichloroethane; an ether solvent such as 1,4-dioxane, cyclopentyl methyl ether, tetrahydrofuran, tetrahydropyran, 1,3-dioxolane, and 1,2-dimethoxyethane; and an aromatic hydrocarbon solvent such as toluene, xylene, and mesitylene. As the solvent, one type thereof may be solely used, and two or more types thereof may also be used in combination at any ratio.

The boiling point of the solvent is preferably 60° C. to 250° C., more preferably 60° C. to 150° C., from the viewpoint of excellent handling properties.

The amount of the solvent is preferably 200 parts by weight or more, more preferably 250 parts by weight or more, and particularly preferably 300 parts by weight or more, and is preferably 650 parts by weight or less, more preferably 550 parts by weight or less, and particularly preferably 450 parts by weight or less, relative to 100 parts by weight of the polymerizable liquid crystal compound. By setting the amount of the solvent to be equal to or more than the lower limit value of the foregoing range, generation of irregular matters can be suppressed. By setting the amount of the solvent to be equal to or less than the upper limit value of the foregoing range, drying load can be reduced.

Examples of other optional components which the liquid crystal composition may contain may include metal; a metal complex; a metal oxide such as titanium oxide; a colorant such as a dye and a pigment; a luminescent material such as a fluorescent material and a phosphorescent material; a surfactant; a leveling agent; a thixotropic agent; a gelling agent; polysaccharides; an ultraviolet absorber; an infrared absorber; an antioxidant; and an ion exchange resin. The amount of each of these components may be 0.1 part by weight to 20 parts by weight, relative to 100 parts by weight of the polymerizable liquid crystal compound.

[3. Properties and Size of Liquid Crystal Cured Layer]

The liquid crystal cured layer is formed of a cured product of the aforementioned liquid crystal composition. The curing of the liquid crystal composition is usually achieved by polymerization of the polymerizable liquid crystal compound. Therefore, the liquid crystal cured layer contains the polymerizable liquid crystal compound which has polymerized (that is, a polymer of the polymerizable liquid crystal compound). The liquid crystal cured layer may contain the polymerizable liquid crystal compound which remains unpolymerized. However, it is preferable that the entirety of the polymerizable liquid crystal compound contained in the liquid crystal cured layer has polymerized.

Since the liquid crystal cured layer contains the polymerizable liquid crystal compound which has polymerized or remains unpolymerized as previously described, the liquid crystal cured layer contains the main chain mesogen of the polymerizable liquid crystal compound. In the liquid crystal cured layer, the main chain mesogen of the polymerizable liquid crystal compound is oriented at a tilt angle in a specific range with respect to the layer plane of the liquid crystal cured layer. Specifically, the tilt angle is usually 85° to 90°, preferably 86° to 90°, and particularly preferably 87° to 90°. In this manner, in the liquid crystal cured layer, the main chain mesogen of the polymerizable liquid crystal compound is oriented in the thickness direction or in a direction close to the thickness direction.

The orientation direction of the main chain mesogen of the polymerizable liquid crystal compound usually coincides with the direction of the maximum refractive index in the refractive index ellipsoid of the molecules of the polymerizable liquid crystal compound. Therefore, the tilt angle formed by the main chain mesogen of the polymerizable liquid crystal compound contained in the liquid crystal cured layer with respect to the layer plane of the liquid crystal cured layer may be obtained by measuring the retardation of the liquid crystal cured layer and performing calculation on the basis of the measured retardation. The tilt angle obtained in this manner represents a tilt angle as the average of the main chain mesogens contained in the liquid crystal cured layer. The retardation is measured in directions with a pitch of 10° in a polar angle range of −40° to 40° with respect to the layer plane of the liquid crystal cured layer. The retardation may be measured using a phase difference meter ("Axoscan" manufactured by Axometrics Inc.). The phase difference meter automatically calculates: a thickness-direction retardation (Rth); and a tilt angle β formed between the direction of the maximum refractive index in the refractive index ellipsoid of the molecules of the polymerizable liquid crystal compound and the layer plane of the liquid crystal cured layer.

In the liquid crystal cured layer, the orientation properties of the main chain mesogen of the polymerizable liquid crystal compound are usually favorable. Therefore, in the liquid crystal cured layer, the occurrence of orientation defects is suppressed. Accordingly, in an embodiment, the following advantage can be obtained. Two linear polarizing plates are placed in a crossed Nichol manner on a surface light source, and the liquid crystal cured layer is placed between the two linear polarizing plates. Since the occurrence of orientation defects is suppressed in the liquid crystal cured layer, the in-plane retardation thereof can be made uniform. Therefore, when a surface of this system on the side that is opposite to the surface light source is observed from a direction vertical to the layer plane of the liquid crystal cured layer, occurrence of a portion having a brightness different from the surroundings can be suppressed.

The main chain mesogen of the polymerizable liquid crystal compound contained in the liquid crystal cured layer is oriented in the thickness direction of the liquid crystal cured layer or in a direction close to the thickness direction. Therefore, usually the birefringence in the in-plane direction of the liquid crystal cured layer can be kept at a low level. This can reduce the in-plane retardation of the liquid crystal cured layer. Accordingly, in an embodiment, the following advantage can be obtained. Two linear polarizing plates are placed in a crossed Nichol manner on a surface light source, and the liquid crystal cured layer is placed between the two linear polarizing plates. Since the liquid crystal cured layer has a small in-plane retardation, change of the polarization state of a polarized light passing through the liquid crystal cured layer in the thickness direction can be suppressed. Therefore, when a surface of this system on the side that is opposite to the surface light source is observed from a direction vertical to the layer plane of the liquid crystal cured layer, transmission of light can be suppressed.

The specific range of the in-plane retardation of the liquid crystal cured layer may be optionally set depending on the use application of the liquid crystal cured layer. For example, the in-plane retardation at a measurement wavelength of 590 nm of the liquid crystal cured layer may be preferably 0 nm to 5 nm, more preferably 0 nm to 3 nm, and particularly preferably 0 nm to 1 nm.

Since the main chain mesogen of the polymerizable liquid crystal compound contained in the liquid crystal cured layer is oriented in the thickness direction of the liquid crystal cured layer or in a direction close to the thickness direction, the liquid crystal cured layer usually has a large birefringence in the thickness direction of the liquid crystal cured layer. Therefore, the liquid crystal cured layer can have a retardation in the thickness direction with a magnitude corresponding to the birefringence. The specific range of the retardation in the thickness direction of the liquid crystal cured layer may be optionally set depending on the use application of the liquid crystal cured layer. For example, the retardation in the thickness direction at a measurement wavelength of 590 nm of the liquid crystal cured layer may be preferably −160 nm or more, more preferably −150 nm or more, and particularly preferably −140 nm or more, and may be preferably −10 nm or less, more preferably −20 nm or less, and particularly preferably −30 nm or less.

Since the polymerizable liquid crystal compound has a reverse wavelength dispersion property, the liquid crystal cured layer usually has a reverse wavelength dispersion property as well. Therefore, the thickness-direction retardations Rth(450) and Rth(550) of the liquid crystal cured layer at measurement wavelengths of 450 nm and 550 nm, respectively, usually satisfy the following formula (ii).

$$|Rth(450)|<|Rth(550)| \qquad (ii)$$

The thickness of the liquid crystal cured layer may be optionally set depending on the use application of the liquid crystal cured layer. The specific thickness of the liquid crystal cured layer is preferably 0.3 μm or more, more preferably 0.5 μm or more, and particularly preferably 0.7 μm or more, and is preferably 2.5 μm or less, more preferably 2.0 μm or less, and particularly preferably 1.5 μm or less.

[4. Method for Producing Liquid Crystal Cured Layer]

The method for producing the liquid crystal cured layer is not limited. For example, the liquid crystal cured layer can be produced by a production method including:

a step of forming an orientation film;

a step of forming a layer of a liquid crystal composition on the orientation film; and a step of curing the layer of the liquid crystal composition to obtain the liquid crystal cured layer. Hereinafter, the method for producing the liquid crystal cured layer according to this example will be described in detail.

[4.1. Formation of Orientation Film]

As the orientation film, a film formed with a material containing a compound having a vertical orientation group may be used. The vertical orientation group refers to a group containing a hydrocarbon group of about 6 to 20 carbon atoms, and specifically represents a group represented by the following formula [C].

[C]

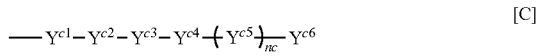

(In the formula [C], $Y^{c1}$ represents a single bond or a linking group, $Y^{c2}$ represents a single bond, an alkylene group of 1 to 15 carbon atoms or —CH$_2$—CH(OH)—CH$_2$—, or represents a divalent cyclic group selected from the group consisting of a benzene ring, a cyclohexane ring, and a heterocycle, where an optional hydrogen atom on the cyclic group may be substituted with an alkyl group of 1 to 3 carbon atoms, an alkoxy group of 1 to 3 carbon atoms, a fluorine-containing alkyl group of 1 to 3 carbon atoms, a fluorine-containing alkoxyl group of 1 to 3 carbon atoms, or a fluorine atom, $Y^{c3}$ represents a single bond or an alkylene group of 1 to 15 carbon atoms, $Y^{c4}$ represents a single bond, or a divalent cyclic group selected from the group consisting of a benzene ring, a cyclohexane ring, and a heterocycle, or represents a divalent organic group of 17 to 30 carbon atoms having a steroid skeleton, where an optional hydrogen atom on the cyclic group may be substituted with an alkyl group of 1 to 3 carbon atoms, an alkoxy group of 1 to 3 carbon atoms, a fluorine-containing alkyl group of 1 to 3 carbon atoms, a fluorine-containing alkoxyl group of 1 to 3 carbon atoms, or a fluorine atom, $Y^{c5}$ represents a divalent cyclic group selected from the group consisting of a benzene ring, a cyclohexane ring, and a heterocycle, where an optional hydrogen atom on the cyclic group may be substituted with an alkyl group of 1 to 3 carbon atoms, an alkoxy group of 1 to 3 carbon atoms, a fluorine-containing alkyl group of 1 to 3 carbon atoms, a fluorine-containing alkoxyl group of 1 to 3 carbon atoms, or a fluorine atom, nc represents an integer of 0 to 4, and when nc is 2 or more, $Y^{c5}$s may be the same as or different from each other, $Y^{c6}$ represents a hydrogen atom, an alkyl group of 1 to 18 carbon atoms, a fluorine-containing alkyl group of 1 to 18 carbon atoms, an alkoxyl group of 1 to 18 carbon atoms, or a fluorine-containing alkoxyl group of 1 to 18 carbon atoms, the alkylene group in $Y^{c2}$ and $Y^{c3}$, as well as the substituent on the cyclic group, or the alkyl group, fluorine-containing alkyl group, alkoxyl group and fluorine-containing alkoxy group in $Y^{c6}$ may be linear, branched or cyclic, or a combination thereof, the alkylene group in $Y^{c2}$ and $Y^{c3}$, as well as the alkyl group, fluorine-containing alkyl group, alkoxyl group, and fluorine-containing alkoxy group in $Y^{c6}$ may be interrupted by 1 to 3 linking groups as long as the linking groups are not adjacent to each other, furthermore, when $Y^{c2}$, $Y^{c4}$ or $Y^{c5}$ represents a divalent cyclic group, or $Y^{c4}$ represents a divalent organic group having a steroid skeleton, or $Y^{c2}$ represents —CH$_2$—CH(OH)—CH$_2$—, or $Y^{c2}$ or $Y^{c3}$ represents an alkylene group, or $Y^{c6}$ represents an alkyl group or a fluorine-containing alkyl group, a bonding between the divalent cyclic group, the divalent organic group having a steroid skeleton, the —CH$_2$—CH(OH)—CH$_2$—, the alkylene group, the alkyl group, and the fluorine-containing alkyl group and an adjacent group thereto may be a single bond or achieved via a linking group, and the linking group represents a group selected from the group consisting of —O—, —CH$_2$O—, —CO—, —COO—, —OCO—, —NHCO—, —CONH—, —NH—CO—O—, —O—CO—NH— and —NH—CO—NH—, with a proviso that $Y^{c2}$ to $Y^{c6}$ are selected so that the sum of the number of carbon atoms including the linking group is 6 to 30).

Preferable examples of the vertical orientation group may include a hydrocarbon group of about 6 to 20 carbon atoms.

Examples of the hydrocarbon group of 6 to 20 carbon atoms may include a linear, branched or cyclic alkyl group of 6 to 20 carbon atoms; and a hydrocarbon group of 6 to 20 carbon atoms containing an aromatic group.

Preferable examples of the vertical orientation group may include an alkyl group (a-1) in which, in the aforementioned formula [C], $Y^{c1}$, $Y^{c2}$ and $Y^{c4}$ are a single bond, $Y^{c3}$ is a single bond or an alkylene group of 1 to 15 carbon atoms, nc is 0, $Y^{c6}$ is an alkyl group of 1 to 18 carbon atoms, and the sum of the carbon atoms of $Y^{c3}$ and $Y^{c6}$ is 6 to 20. Examples of such alkyl groups (a-1) may include an n-hexyl group, a 1-methyl-n-pentyl group, a 2-methyl-n-pentyl group, a 3-methyl-n-pentyl group, a 4-methyl-n-pentyl group, a 1,1-dimethyl-n-butyl group, a 1,2-dimethyl-n-butyl group, a 1,3-dimethyl-n-butyl group, a 2,2-dimethyl-n-butyl group, a 2,3-dimethyl-n-butyl group, a 3,3-dimethyl-n-butyl group, a 1-ethyl-n-butyl group, a 2-ethyl-n-butyl group, a 1,1,2-trimethyl-n-propyl group, 1,2,2-trimethyl-n-propyl group, a 1-ethyl-1-methyl-n-propyl group, a 1-ethyl-2-methyl-n-propyl group, an n-heptyl group, a 1-methyl-n-hexyl group, a 2-methyl-n-hexyl group, a 3-methyl-n-hexyl group, a 1,1-dimethyl-n-pentyl group, a 1,2-dimethyl-n-pentyl group, a 1,3-dimethyl-n-pentyl group, a 2,2-dimethyl-n-pentyl group, a 2,3-dimethyl-n-pentyl group, a 3,3-dimethyl-n-pentyl group, a 1-ethyl-n-pentyl group, a 2-ethyl-n-pentyl group, a 3-ethyl-n-pentyl group, a 1-methyl-1-ethyl-n-butyl group, a 1-methyl-2-ethyl-n-butyl group, a 1-ethyl-2-methyl-n-butyl group, a 2-methyl-2-ethyl-n-butyl group, a 2-ethyl-3-methyl-n-butyl group, an n-octyl group, a 1-methyl-n-heptyl group, a 2-methyl-n-heptyl group, a 3-methyl-n-heptyl group, a 1,1-dimethyl-n-hexyl group, a 1,2-dimethyl-n-hexyl group, a 1,3-dimethyl-n-hexyl group, a 2,2-dimethyl-n-hexyl group, a 2,3-dimethyl-n-hexyl group, a 3,3-dimethyl-n-hexyl group, a 1-ethyl-n-hexyl group, a 2-ethyl-n-hexyl group, a 3-ethyl-n-hexyl group, a 1-methyl-1-ethyl-n-pentyl group, a 1-methyl-2-ethyl-n-pentyl group, a 1-methyl-3-ethyl-n-pentyl group, a 2-methyl-2-ethyl-n-pentyl group, a 2-methyl-3-ethyl-n-pentyl group, a 3-methyl-3-ethyl-n-pentyl group, an n-nonyl group, an n-decyl group, an n-undecyl group, an n-dodecyl group, an n-tridecyl group, an n-tetradecyl group, and an n-pentadecyl group.

In addition to the above, preferable examples of the vertical orientation group may include a group (a-2) in which, in the aforementioned formula [C], $Y^{c1}$ to $Y^{c4}$ are a single bond, nc is 2 to 3, $Y^{c6}$ is a divalent cyclic group selected from the group consisting of a benzene ring and a cyclohexane ring, and $Y^{c6}$ is an alkyl group of 1 to 18 carbon atoms. Preferable examples of such a group (a-2) may include groups represented by the following (a-2-1) to (a-2-7).

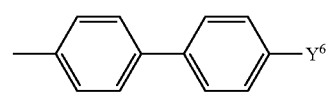

(a-2-1)

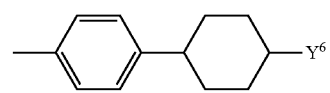

(a-2-2)

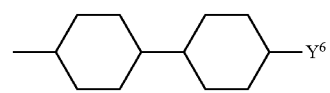

(a-2-3)

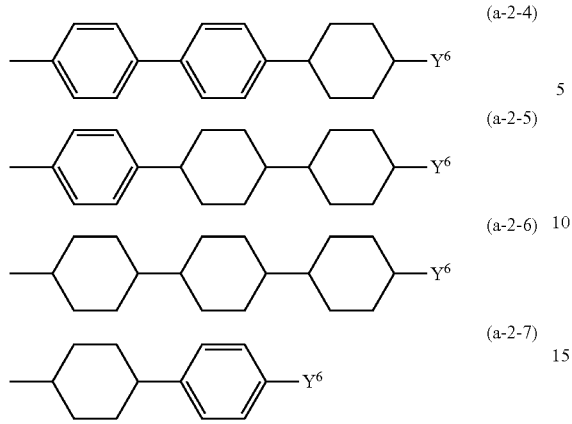

(a-2-4)
(a-2-5)
(a-2-6)
(a-2-7)

In the formulas (a-2-1) to (a-2-7), $Y^6$ represents an alkyl group of 1 to 18 carbon atoms.

In addition to the above, preferable examples of the vertical orientation group may include a group (a-3) in which, in the aforementioned formula [C], $Y^{c1}$ to $Y^{c3}$ are a single bond, $Y^{c4}$ is a divalent organic group of 17 to 30 carbon atoms having a steroid skeleton, nc is 0, and $Y^{c6}$ is a hydrogen atom. Preferable examples of such a group (a-3) may include groups represented by the following formulas (a-3-1) to (a-3-8).

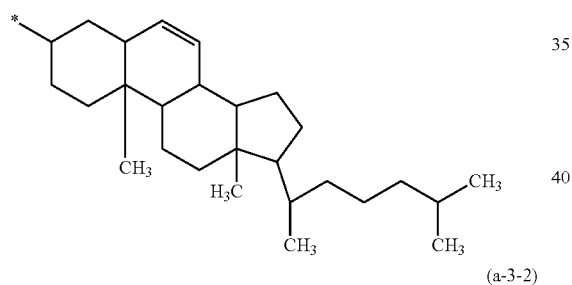

(a-3-1)

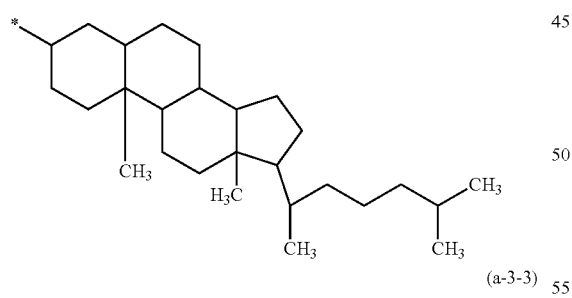

(a-3-2)

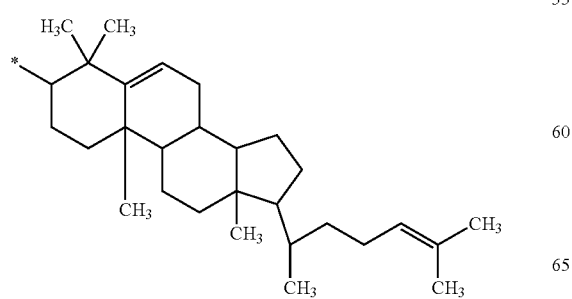

(a-3-3)

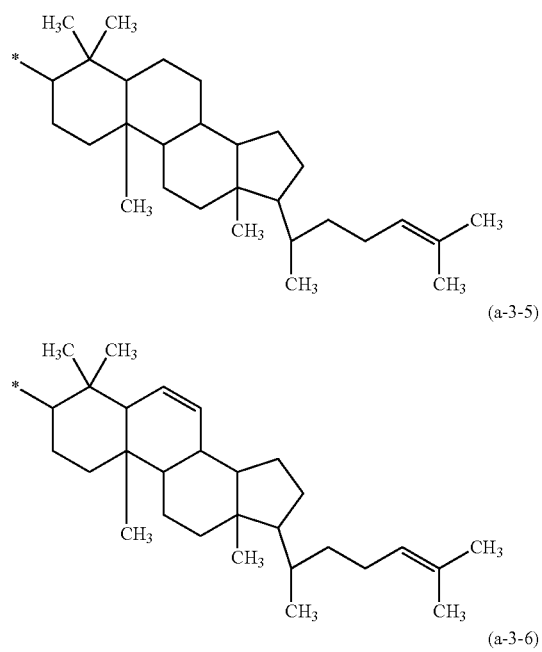

(a-3-4)
(a-3-5)
(a-3-6)

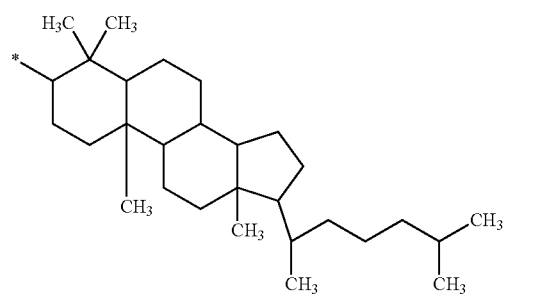

(a-3-7)

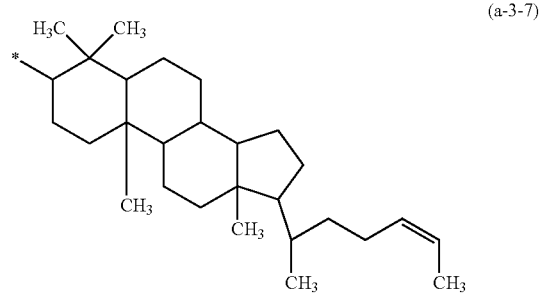

(a-3-8)

In the formulas (a-3-1) to (a-3-8), an asterisk mark * represents a bonding position.

For details of the vertical orientation groups, reference may be made to the descriptions of International Publication No. 2015/019962, International Publication No. 2015/

030004, International Publication No. 2016/031917, International Publication No. 2016/039337, and International Publication No. 2016/129642.

Usually, the orientation film may be formed with an orientation film composition containing the compound having a vertical orientation group, on an appropriate support surface. As the support surface, any optional surface capable of supporting a layer of the orientation film composition may be used. From the viewpoint of improving the surface state of the liquid crystal cured layer, this support surface to be used is preferably a flat surface without concave and convex portions. Also, from the viewpoint of enhancing the productivity of the liquid crystal cured layer, the support surface to be used is preferably a surface of a long-length substrate. The term "long-length" refers to a shape with the length that is 5 times or more the width, and preferably a film with the length that is 10 times or more the width, and specifically refers to a film shape having a length that allows a film to be wound up into a rolled shape for storage or transportation.

As the substrate, a resin film or a glass plate is usually used. In particular, in a case wherein a heat treatment or an orientation treatment is performed at high temperature, a substrate capable of enduring the temperature is preferably selected. As the resin, a thermoplastic resin is usually used. In particular, because of its excellent transparency, low hygroscopicity, size stability and lightweight properties, a resin containing an alicyclic structure-containing polymer, such as a norbornene-based resin, is preferably used. A suitable example as a trade name of the resin to be contained in the substrate may include "ZEONOR" manufactured by ZEON Corporation as a norbornene-based resin.

As the compound having a vertical orientation group, any optional compound having a vertical orientation group may be used. Among these, from the viewpoint of obtaining a stable orientation film, it is preferable that the compound having, in combination with the vertical orienting group, a vertical orienting group contains a cross-linkable group which is capable of being cross-linked. As the compound having a vertical orientation group, for example, compounds described in International Publication No. 2015/019962, International Publication No. 2015/030004, International Publication No. 2016/031917, International Publication No. 2016/039337, and International Publication No. 2016/129642 may be used. As the compound having a vertical orientation group, one type thereof may be solely used, and two or more types thereof may also be used in combination at any ratio.

The orientation film composition may further include an optional component in combination with the compound having a vertical orientation group. For example, the orientation film composition may include a cross-linking agent. By using a cross-linking agent, a stable orientation film can be obtained. As the cross-linking agent, for example, compounds described in International Publication No. 2015/019962, International Publication No. 2015/030004, International Publication No. 2016/031917, International Publication No. 2016/039337, and International Publication No. 2016/129642 can be used. As the cross-linking agent, one type thereof may be solely used, and two or more types thereof may also be used in combination at any ratio. The amount of the cross-linking agent is preferably 1 part by weight or more, and more preferably 5 parts by weight or more, and is preferably 100 parts by weight or less, and more preferably 80 parts by weight or less, relative to 100 parts by weight of the compound having a vertical orientation group.

Examples of the optional component which the orientation film composition may contain may include an acid catalyst. Use of the acid catalyst can promote a cross-linking reaction. As the acid catalyst, for example, a compound described in International Publication No. 2015/030004 may be used. As the acid catalyst, one type thereof may be solely used, and two or more types thereof may also be used in combination at any ratio. The amount of the acid catalyst is preferably 0.01 part by weight or more, more preferably 0.1 part by weight or more, and further preferably 0.5 part by weight or more, and is preferably 20 parts by weight or less, more preferably 15 parts by weight or less, and particularly preferably 10 parts by weight or less, relative to 100 parts by weight of the compound having a vertical orientation group.

Other examples of the optional components which the orientation film composition may contain may include compounds described in International Publication No. 2015/019962, International Publication No. 2015/030004, International Publication No. 2016/031917, International Publication No. 2016/039337, and International Publication No. 2016/129642.

Usually, the orientation film can be formed by a forming method including a step of coating the support surface with the orientation film composition. Examples of the coating methods may include a curtain coating method, an extrusion coating method, a roll coating method, a spin coating method, a dip coating method, a bar coating method, a spray coating method, a slide coating method, a print coating method, a gravure coating method, a die coating method, a gap coating method, and a dipping method.

After the orientation film composition is coated, a step of subjecting the orientation film composition layer formed by coating to a heat treatment may be performed if necessary. The heat treatment can remove volatile components such as a solvent from the layer of the orientation film composition. In the case where the orientation film composition contains a cross-linkable component, proceeding of the cross-linking reaction can be achieved by the heat treatment. The cross-linking can suppress elution of components contained in the orientation film to migrate into the liquid crystal composition. The heating temperature is preferably from 60° C. to 200° C., more preferably from 70° C. to 160° C. The heating time is preferably from 0.4 minute to 60 minutes, more preferably from 0.5 minute to 10 minutes.

The orientation film can be obtained by applying the orientation film composition onto the support surface, and, if necessary, subjecting the composition to a heat treatment. The thickness of the orientation film may be, for example, 0.05 μm to 5 μm.

[4.2. Formation of Layer of Liquid Crystal Composition]

After the step of forming the orientation film, a step of forming a layer of the liquid crystal composition on the orientation film is performed. The liquid crystal composition is usually prepared in a liquid state. Therefore, usually, the liquid crystal composition is applied onto the orientation film to form a layer of the liquid crystal composition. As the coating method, for example, the same example as those of the coating method of the orientation film composition may be mentioned.

[4.3. Orientation of Polymerizable Liquid Crystal Compound Contained in Layer of Liquid Crystal Composition]

If necessary, after the step of forming the layer of the liquid crystal composition, a step of subjecting the layer of the liquid crystal composition to an orientation treatment for giving orientation to the polymerizable liquid crystal compound is performed. Accordingly, the molecules of the polymerizable liquid crystal compound contained in the layer of the liquid crystal cured layer is oriented in the thickness direction of the layer or in a direction close to the thickness direction.

In the orientation treatment, the layer of the liquid crystal composition is usually maintained under a specific temperature condition for a specific period of time. The orientation temperature may be a temperature that is equal to or higher than the liquid crystallization temperature of the liquid crystal composition. Also, the orientation temperature is preferably a temperature that is lower than the glass transition temperature of the resin contained in the substrate. By setting the temperature in this manner, occurrence of the distortion of the substrate caused by the orientation treatment can be suppressed. A specific example of the condition for the orientation treatment may be a temperature of 50 to 160° C. for 30 seconds to 5 minutes.

However, the orientation of the polymerizable liquid crystal compound sometimes proceeds without performing any particular treatment. Therefore, the orientation treatment may not be necessarily performed as long as a desired liquid crystal cured layer is obtained.

[4.4. Curing of Layer of Liquid Crystal Composition]

After the layer of the liquid crystal composition has been formed, and subjected to an orientation treatment if necessary, a step of curing the layer of the liquid crystal composition to obtain a liquid crystal cured layer is performed. In this step, the layer of the liquid crystal composition is usually cured by polymerization of the polymerizable liquid crystal compound. The polymerizable liquid crystal compound usually polymerizes while maintaining its molecular orientation. Since fluidity before curing is lost as a result of the curing, the orientation of the main chain mesogen of the polymerizable liquid crystal compound is usually fixed keeping the orientation of the pre-curing state in the obtained liquid crystal cured layer. In this manner, there is obtained a liquid crystal cured layer that contains the main chain mesogen of the polymerizable liquid crystal compound oriented in the thickness direction or in a direction close to the thickness direction.

As the polymerization method, a method compatible with the properties of the components contained in the liquid crystal composition may be selected. Examples of the polymerization method may include a method of performing irradiation with an active energy ray, and a thermopolymerization method. Among these, a method of performing irradiation with an active energy ray is preferable because heating is not necessary and the proceeding of the polymerization reaction can be effected at room temperature. Herein, the active energy ray for the irradiation may include light such as visible light, UV light, and infrared light, as well as any optional energy ray such as an electron beam.

Among these, since the operation is simple, a method of performing irradiation with light such as UV light is preferable. The temperature during UV irradiation is preferably equal to or lower than the glass transition temperature of the substrate, and preferably 150° C. or lower, more preferably 100° C. or lower, and particularly preferably 80° C. or lower. The lower limit of the temperature during UV irradiation may be 15° C. or higher. The irradiation intensity of UV light is preferably 0.1 mW/cm$^2$ or more, and more preferably 0.5 mW/cm$^2$ or more, and is preferably 10000 mW/cm$^2$ or less, and more preferably 5000 mW/cm$^2$ or less. The irradiation amount of UV light is preferably 0.1 mJ/cm$^2$ or more, and more preferably 0.5 mJ/cm$^2$ or more, and is preferably 10000 mJ/cm$^2$ or less, and more preferably 5000 mJ/cm$^2$ or less.

[4.5. Optional Step]

By the aforementioned production method, there can be obtained a liquid crystal cured layer formed of a cured product of the liquid crystal composition. This production method may further include an optional step in combination with the aforementioned steps.

The method for producing the liquid crystal cured layer may include, for example, a step of subjecting the support surface to a surface treatment. By the surface treatment, adhesiveness between the support surface and the orientation film can be enhanced. Examples of the surface treatment may include a corona treatment, a plasma treatment, and a UV irradiation treatment.

In the aforementioned production method, the liquid crystal cured layer is usually obtained as a part of a multi-layer film including the substrate, the orientation film, and the liquid crystal cured layer. Therefore, the method for producing the liquid crystal cured layer may include, as an optional step, for example, a step of peeling the substrate from the multilayer film. The method for producing the liquid crystal cured layer may include, as an optional step, for example, a step of peeling the substrate and orientation film from the multilayer film.

Furthermore, the method for producing the liquid crystal cured layer may include, as an optional step, for example, a step of transferring the liquid crystal cured layer to an optional film layer. Therefore, for example, the method for producing the liquid crystal cured layer may include a step of, after the liquid crystal cured layer and the optional film layer have been bonded to each other, peeling the substrate or orientation film if necessary to obtain a film including the liquid crystal cured layer and the optional film layer. For the bonding, an appropriate tackiness agent or adhesive agent may be used.

Also, the method for producing the liquid crystal cured layer may include, for example, a step of further forming an optional layer on the liquid crystal cured layer. Examples of the optional layer may include: an adhesive layer for bonding with another member; a matte layer for improving sliding properties of the film; a hard coat layer such as an impact-resistant polymethacrylate resin layer; an antireflective layer; and an antifouling layer.

According to the aforementioned production method, a long-length liquid crystal cured layer can be obtained using a long-length substrate. According to such a production method, the liquid crystal cured layer can be continuously produced, thereby achieving excellent productivity. Also, the long-length liquid crystal cured layer can be bonded to another film layer in a roll-to-roll manner, which also contributes to the achievement of excellent productivity. Usually, the long-length liquid crystal cured layer is wound up, and stored and transported in a form of a roll.

[4.6. Description on Mechanism for Achieving Orientation in Thickness Direction]

The mechanism for increasing the tilt angle formed by the main chain mesogen of the polymerizable liquid crystal compound with respect to the layer plane of the liquid crystal cured layer according to the aforementioned production method will be described by illustrating examples. However, the technical scope of the present invention is not limited by the mechanism described in the following.

FIG. 1 is a cross-sectional view schematically illustrating an example of a liquid crystal composition layer 130 formed on an orientation film 120.

As illustrated in FIG. 1, in this example, the orientation film 120 is formed on a substrate 110, and the liquid crystal composition layer 130 is formed on this orientation film 120. Since the orientation film 120 is formed with a material containing a compound having a vertical orientation group 121, the orientation film 120 has on its surface 120U the vertical orientation group 121. This vertical orientation group 121 usually extends in the thickness direction of the liquid crystal composition layer 130.

The liquid crystal composition layer 130 includes a polymerizable liquid crystal compound 131 and an orientation aid 132. The orientation aid 132 has a main chain 133 and a side chain 134 bonded to this main chain. The side chain 134 corresponds to one or both of the side chain group A of the monomer unit A and the side chain group B of the monomer unit B. At least a part, or the entirety of the orientation aid 132 can be unevenly located near an air interface 130U of the liquid crystal composition layer 130. Accordingly, the side chain 134 of the orientation aid 132 extends in the thickness direction of the liquid crystal composition layer 130.

In such a state, the orientation of the main chain mesogen of the polymerizable liquid crystal compound 131 is controlled by the vertical orientation group 121 of the orientation film 120 and the side chain 134 of the orientation aid 132, and accordingly oriented in the thickness direction of the liquid crystal composition layer 130 or in a direction close to the thickness direction. The present inventor infers that this can increase the tilt angle formed by the main chain mesogen of the polymerizable liquid crystal compound with respect to the layer plane of the liquid crystal cured layer, in the liquid crystal cured layer (not illustrated) obtained by curing of the liquid crystal composition layer 130.

[5. Optical Film]

An optical film according to an embodiment of the present invention includes the aforementioned liquid crystal cured layer. This optical film may be used as an optical member, by taking advantage of excellent optical properties of the liquid crystal cured layer. Specific examples of the use application of the optical film may include a polarizer protective film, an optical compensation film, and a viewing angle expansion film.

The optical film may be a film including only the liquid crystal cured layer, but may further include an optional layer in combination with the liquid crystal cured layer.

For example, the optical film may include an orientation film. Such an optical film usually has a multilayer structure including the liquid crystal cured layer and the orientation film.

The optical film may also include, for example, a substrate. Such an optical film usually has a multilayer structure including the liquid crystal cured layer, the orientation film, and the substrate in this order.

The optical film may further include, for example, a λ/4 plate. The λ/4 plate refers to a layer having an in-plane retardation in a specific range at a wavelength of 550 nm. Specifically, the in-plane retardation at a wavelength of 550 nm of the λ/4 plate is preferably 110 nm or more, more preferably 120 nm or more, and particularly preferably 125 nm or more, and is preferably 165 nm or less, more preferably 155 nm or less, and particularly preferably 150 nm or less. Examples of such a λ/4 plate to be used may include a stretched film obtained by stretching a resin film, and an optically anisotropic layer formed of a cured product of a liquid crystal composition which is the same as or different from the aforementioned liquid crystal composition.

Other examples of the optional layer may include: a phase difference film; an adhesive layer for bonding with another member; a matte layer for improving sliding properties of the film; a hard coat layer such as an impact-resistant polymethacrylate resin layer; an antireflective layer; and an antifouling layer.

The optical film preferably has excellent transparency. Specifically, the total light transmittance of the optical film is preferably 75% or more, more preferably 80% or more, and particularly preferably 84% or more. The haze of the optical film is preferably 5% or less, more preferably 3% or less, and particularly preferably 1% or less. The total light transmittance may be measured using an ultraviolet-visible spectrophotometer in a wavelength range of 400 nm to 700 nm. The haze may be measured using a haze meter.

[6. Polarizing Plate]

A polarizing plate according to an embodiment of the present invention includes the aforementioned optical film and a linear polarizer. Since the optical film can have an increased tilt angle formed by the main chain mesogen of the polymerizable liquid crystal compound with respect to the layer plane of the liquid crystal cured layer as previously described, the optical film has birefringence in the thickness direction. Therefore, the optical film can perform adequate optical compensation for a light passing through the polarizing plate in a tilt direction that is neither parallel to nor vertical to the thickness direction.

Examples of the linear polarizer may include: a film obtained by causing a polyvinyl alcohol film to adsorb iodine or dichroic dye and thereafter uniaxially stretching the film in a boric acid bath; and a film obtained by causing a polyvinyl alcohol film to adsorb iodine or dichroic dye, stretching the film, and modifying some of polyvinyl alcohol units in the molecular chain into polyvinylene units. Another example of the linear polarizer may include a polarizer having the function of separating polarized light into reflected light and transmitted light, such as a grid polarizer and a multilayer polarizer. Among these, a polarizer containing polyvinyl alcohol is preferable as the linear polarizer.

When natural light is allowed to enter the linear polarizer, only one polarized light passes therethrough. The polarization degree of this linear polarizer is not particularly limited, but preferably 98% or more, more preferably 99% or more.

The thickness of the linear polarizer is preferably 5 μm to 80 μm.

When the optical film includes the λ/4 plate, a polarizing plate including this optical film and the polarizing plate in combination can function as a circularly polarizing plate or an elliptically polarizing plate. For example, such a polarizing plate can have the effect of suppressing the reflection of external light when provided to a display device. Such a polarizing plate can also have the effect of improving the visibility when polarizing sunglasses are worn. In these cases, as the optical film includes a liquid crystal cured layer having birefringence in the thickness direction, the aforementioned effects can be obtained not only in a front direction that is vertical to the display surface but also in a tilt direction that is not parallel to the display surface.

When the polarizing plate is to function as a circularly polarizing plate, an angle formed between the polarization absorption axis of the linear polarizer and the slow axis of the λ/4 plate is preferably 45° or an angle close to 45°. The aforementioned angle is preferably 45±5° (i.e., 40 to 50°), more preferably 45±4° (i.e., 41 to 49°), and particularly preferably 45±3° (i.e., 42 to 48°).

The polarizing plate may further include an optional layer other than the linear polarizer and the optical film. Examples of the optional layer may include: an adhesive layer for bonding the linear polarizer and the optical film; and a polarizer protective film layer for protecting the linear polarizer.

[7. Display Device]

A display device according to an embodiment of the present invention includes the aforementioned polarizing plate. Examples of such a display device may include an organic electroluminescent display device (hereinafter, sometimes appropriately referred to as an "organic EL display device") and a liquid crystal display device.

The organic EL display device includes the aforementioned polarizing plate, and usually further includes an organic electroluminescent element (hereinafter, sometimes appropriately referred to as an "organic EL element"). The organic EL display device usually includes the polarizing plate on the viewing side of the organic EL element. Also, the polarizing plate includes the optical film and the linear polarizer in this order from the organic EL element side. When the optical film includes the λ/4 plate, the polarizing plate can function as a reflection suppression film.

Hereinafter, the mechanism of the reflection suppression will be described by referring to an example in which the polarizing plate functions as a circularly polarizing plate. Of incident light coming from the outside of the device, only a part of linearly polarized light passes through the linear polarizer, and subsequently passes through the optical film including the λ/4 plate to become circularly polarized light. The circularly polarized light is reflected on a constituent (such as a reflective electrode of an organic EL element) that reflects light in the organic EL element, and passes through the optical film again to become linearly polarized light having a vibration direction intersecting the vibration direction of the incident linearly polarized light. Accordingly the light does not pass through the linear polarizer. Herein, the vibration direction of the linearly polarized light means the vibration direction of the electric field of the linearly polarized light. Accordingly, the function of suppressing reflection is achieved. For the principle of such reflection suppression, Japanese Patent Application Laid-Open No. Hei. 9-127885 A may be referred to. Since the liquid crystal cured layer contained in the optical film can increase the tilt angle formed by the main chain mesogen of the polymerizable liquid crystal compound with respect to the layer plane of the liquid crystal cured layer, and thereby has birefringence in the thickness direction, the aforementioned reflection suppression effect can be obtained not only in the front direction of the display surface but also in the tilt direction. As a result, there can be obtained an organic EL display device having a wide viewing angle.

Furthermore, the polarizing plate in the organic EL display device may include the linear polarizer and the optical film having the λ/4 plate in this order from the organic EL element side. For example, a polarizing plate, which includes the optical film having the λ/4 plate, the linear polarizer, and the optical film having the λ/4 plate in this order, may be disposed on the viewing side of the organic EL element. In this case, the visibility when polarizing sunglasses are worn can be improved in the same manner as the later-described liquid crystal display device.

The organic EL element usually includes a transparent electrode layer, a light-emitting layer, and an electrode layer in this order. When voltage is applied from the transparent electrode layer and the electrode layer, the light-emitting layer can generate light. Examples of the material constituting an organic light-emitting layer may include a polyparaphenylene-vinylene-based material, a polyfluorene-based material, and a polyvinylcarbazole-based material. The light-emitting layer may have a layered body including a plurality of layers having different light-emitting colors, or a mixed layer in which a layer having a certain pigment is doped with another pigment. Furthermore, the organic EL element may include a functional layer such as a hole injection layer, a hole transport layer, an electron injection layer, an electron transport layer, an equipotential surface formation layer, and an electronic charge generation layer.

The liquid crystal display device includes the aforementioned polarizing plate, and usually further includes a liquid crystal cell. The liquid crystal display device usually includes the polarizing plate on the viewing side of the liquid crystal cell.

When the polarizing plate includes the linear polarizer and the optical film having the λ/4 plate in this order from the liquid crystal cell side, the visibility when polarizing sunglasses are worn can be improved. Hereinafter, a mechanism for improving the visibility will be described by referring to an example in which the polarizing plate functions as a circularly polarizing plate. Light for displaying an image is linearly polarized light at the time point of having passed through the liquid crystal cell and the linear polarizer of the polarizing plate. This linearly polarized light can be blocked by polarizing sunglasses. However, by passing through the optical film having the λ/4 plate, the linearly polarized light becomes circularly polarized light. Since this circularly polarized light can at least partly pass through the polarizing sunglasses, the visibility when polarizing sunglasses are worn can be improved. Since the liquid crystal cured layer contained in the optical film can increase the tilt angle formed by the main chain mesogen of the polymerizable liquid crystal compound with respect to the layer plane of the liquid crystal cured layer, and thereby has birefringence in the thickness direction, the aforementioned visibility improvement effect can be obtained not only in the front direction of the display surface but also in the tilt direction. As a result, there can be obtained a liquid crystal display device that has a wide viewing angle even when polarizing sunglasses are worn.

The liquid crystal cell may be of any optional mode such as an in-plane switching (IPS) mode, a vertical alignment (VA) mode, a multi-domain vertical alignment (MVA) mode, a continuous pinwheel alignment (CPA) mode, a hybrid alignment nematic (HAN) mode, a twisted nematic (TN) mode, a super twisted nematic (STN) mode, and an optical compensated bend (OCB) mode.

EXAMPLES

Hereinafter, the present invention will be specifically described by illustrating Examples. However, the present invention is not limited to the Examples described below. The present invention may be optionally modified for implementation without departing from the scope of claims of the present invention and its equivalents.

In the following description, "%", and "part" representing quantity are on the basis of weight, unless otherwise specified. The following operations were performed at normal temperature and under normal pressure in an atmospheric air, unless otherwise specified.

Example 1

(1-1. Preparation of Orientation Film Composition)

100.0 parts by weight of an orienting material composition ("HSPA-612" manufactured by Nissan Chemical Corporation) and 3.0 parts by weight of a curing agent composition for an orienting material ("HSPA-CAT1" manufactured by Nissan Chemical Corporation) were mixed and stirred to prepare an orientation film composition (1). The ingredient compositions of the orienting material composition and the curing agent composition for an orienting material are as shown in the following Table 1. The orienting material composition ("HSPA-612" manufactured by Nissan Chemical Corporation) includes, as a resin composition, a compound containing a vertical orientation group represented by the formula [C] and a cross-linkable group, and a cross-linking agent.

TABLE 1

[Ingredient compositions of the orienting material composition and the curing agent composition for orienting material]

|  | Ingredients | Parts by weight |
| --- | --- | --- |
| Orienting material composition HSPA-612 | Propylene glycol monomethyl ether | 61.0 |
|  | Methyl ethyl ketone | 15.0 |
|  | Butyl acetate | 19.0 |
|  | Resin composition | 5.0 |
| Curing agent composition for orienting material HSPA-CAT1 | Propylene glycol monomethyl ether | 90.0 |
|  | Acid catalyst | 10.0 |

(1-2. Formation of Orientation Film)

As a support body, a long-length resin film formed of a norbornene-based polymer ("ZEONOR Film: ZF16-100" manufactured by ZEON Corporation; thickness 100 μm) was prepared. The glass transition temperature Tg of the resin contained in this resin film was 163° C.

The surface of the support body was subjected to a corona treatment with an intensity of 200 W·min/m². The corona-treated surface of the support body was bar-coated with the orientation film composition (1) using a wire bar (#2) to form a layer of the orientation film composition (1). After that, the layer of the orientation film composition (1) was subjected to a heat treatment in a drying oven under the condition of 110° C. for 1 minute to form an orientation film on the support body. In this manner, a multilayer support film including the support body and the orientation film was obtained.

(1-3. Production of Orientation Aid)

A monomer containing an aromatic ring represented by the formula (X-1), a monomer containing an aliphatic hydrocarbon group represented by the formula (X-2), azobisisobutyronitrile as a polymerization initiator represented by the formula (X-3), and cyclopentanone as a solvent were mixed in weight ratios shown in the following Table 2, and stirred for dissolution. After that, reaction was allowed to proceed under nitrogen atmosphere at 80° C. for 16 hours to obtain a cyclopentanone solution containing an orientation aid as a copolymer represented by the formula (X-4). Subsequently, this solution was subjected to a drying treatment to volatilize cyclopentanone, whereby an orientation aid was obtained.

TABLE 2

[Monomer mixture solvent]

|  | Parts by weight | Molar ratio |
| --- | --- | --- |
| Monomer containing aromatic ring (X-1) | 20.000 | 70.00 |
| Monomer containing aliphatic hydrocarbon group (X-2) | 8.981 | 30.00 |
| Azobisisobutyronitrile (X-3) | 1.449 | 12.73 |
| Cyclopentanone | 121.72 | — |

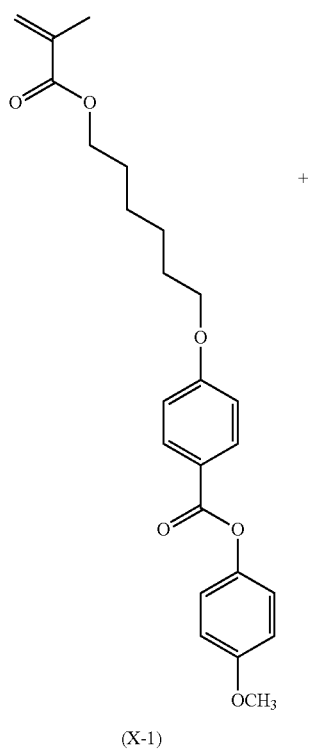

(X-1)

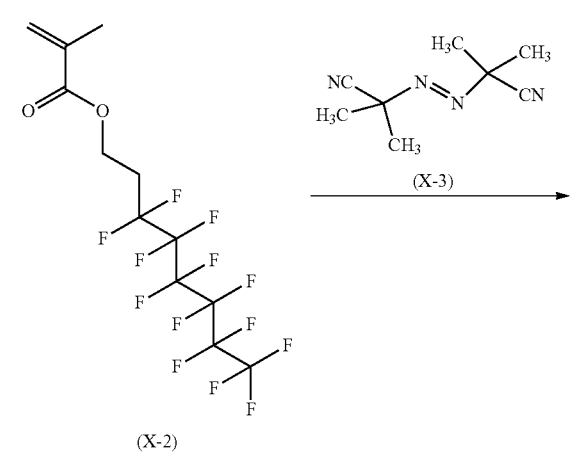

(X-2)

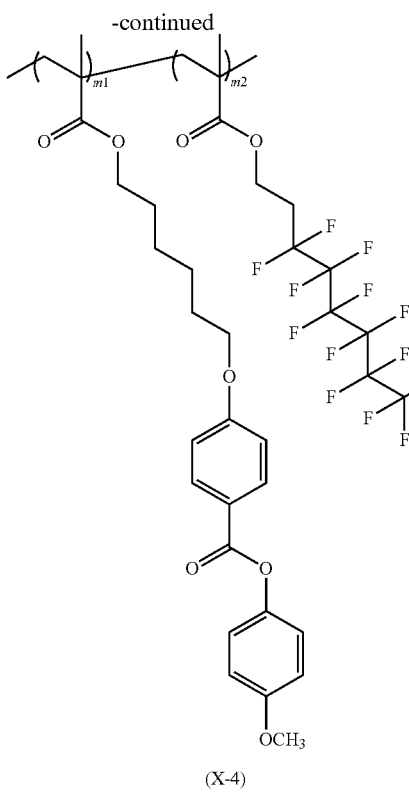

(X-4)

m1:m2 = 70:30

(1-4. Production of Liquid Crystal Composition)

100 parts by weight of a polymerizable liquid crystal compound having a reverse wavelength dispersion property represented by the following formula (I-1), 5 parts by weight of the aforementioned orientation aid, 3 parts by weight of a photopolymerization initiator ("Irgacure Oxe04" manufactured by BASF SE), and 432 parts by weight of cyclopentanone were mixed and stirred for dissolution to obtain a liquid crystal composition.

(1-5. Production of Liquid Crystal Cured Layer)

The orientation film of the aforementioned multilayer support film was bar-coated with the liquid crystal composition using a wire bar (#4) to form a layer of the liquid crystal composition. Subsequently, the layer of the liquid crystal composition was subjected to an orientation treatment in a drying oven under the condition of 110° C. for 3 minutes. After that, the layer of the liquid crystal composition was irradiated with UV light at 500 mJ/cm² or more by a high pressure mercury lamp under the atmosphere of an oxygen concentration of 1000 ppm or less to cure the layer of the liquid crystal composition. Accordingly, an optical film including (the liquid crystal cured layer)/(the orientation film)/(the support body) was obtained.

(1-6. Preparation of Evaluation Sample)

The surface on the liquid crystal cured layer side of the aforementioned optical film was subjected to a corona treatment with an intensity of 200 W·min/m². This corona-treated surface of the liquid crystal cured layer and a glass substrate were bonded to each other through a tackiness agent. After that, the orientation film and the support body were peeled to obtain an evaluation sample (1) including (the liquid crystal cured layer)/(the tackiness agent)/(the glass substrate).

(1-7. Observation of Orientation State of Liquid Crystal Cured Layer)

Two linear polarizing plates were disposed on a surface light source in a Crossed Nichol manner. Between the two linear polarizing plates, the evaluation sample (1) was disposed, such that the in-plane direction of each of the linear polarizing plates and the layer plane of the liquid crystal cured layer of the evaluation sample become parallel.

While the surface light source emits light, observation was performed from a direction that is vertical to the layer plane of the liquid crystal cured layer of the evaluation sample (1) (parallel arrangement). This observation was performed from a position that was farther from the surface light source than the linear polarizing plate disposed farther from the surface light source. As a result, light leakage due to depolarization or in-plane retardation was not observed.

Furthermore, in the same plane as the polarizing plate plane, the layer plane of the liquid crystal cured layer of the evaluation sample (1) was slightly rotated around the axis in the 45° direction with respect to the absorption axis of the polarizing plate (tilt arrangement). As a result of the observation in this state, light leakage was observed.

(1-8. Measurement of Tilt Angle of Main Chain Mesogen of Polymerizable Liquid Crystal Compound)

The retardation of the evaluation sample (1) was measured using a phase difference meter ("Axoscan" manufactured by Axometrics Inc.) with a pitch of 10° in a polar angle range of −40 to 40°. Since the glass substrate and the tackiness agent do not have retardation, the measured retardation is the retardation of the liquid crystal cured layer of the evaluation sample (1). From this measurement result, a tilt angle β formed by the main chain mesogen of the polymerizable liquid crystal compound contained in the liquid crystal cured layer with respect to the layer plane of the liquid crystal cured layer was calculated through automatic calculation by the aforementioned phase difference meter. The tilt angle β becomes 0° when the main chain mesogen is oriented in the in-plane direction of the liquid crystal cured layer, and 90° when the main chain mesogen is oriented in parallel to the thickness direction of the liquid crystal cured layer.

As a result of the measurement, the tilt angle β of the main chain mesogen of the evaluation sample (1) was 90.0°. From this result, it was confirmed that the main chain mesogen of the polymerizable liquid crystal compound contained in the (I-1)

[Chemical structure of formula (I-1)]

liquid crystal cured layer of the evaluation sample (1) was oriented in the thickness direction of the liquid crystal cured layer.

Example 2

In the above-described step (1-4), the amount of the orientation aid was changed to 3 parts by weight. An evaluation sample (2) was produced and evaluated by the same operation as that of Example 1 except for the aforementioned matter.

Example 3

In the above-described step (1-4), the amount of the orientation aid was changed to 1 part by weight. An evaluation sample (3) was produced and evaluated by the same operation as that of Example 1 except for the aforementioned matter.

Example 4

In the above-described step (1-4), the amount of the orientation aid was changed to 7 parts by weight. An evaluation sample (4) was produced and evaluated by the same operation as that of Example 1 except for the aforementioned matter.

Example 5

In the above-described step (1-3), the molar ratio of the monomer containing an aromatic ring represented by the formula (X-1) relative to the monomer containing an aliphatic hydrocarbon group represented by the formula (X-2) was changed to 80:20. An evaluation sample (5) was produced and evaluated by the same operation as that of Example 1 except for the aforementioned matter.

Comparative Example 1

In the above-described step (1-4), the orientation aid was not used. An evaluation sample (6) was produced and evaluated by the same operation as that of Example 1 except for the aforementioned matter.

Comparative Example 2

The orientation film was not formed. That is, the surface of the resin film as a support body was subjected to a corona treatment with an intensity of 200 W·min/m². Then, this corona-treated surface of the support body was bar-coated with the liquid crystal composition. An evaluation sample (8) was produced and evaluated by the same operation as that of Example 1 except for the aforementioned matter.

[Results]

The results of Examples and Comparative Examples are shown in the following Table 3. In the following Table 3, meanings of the abbreviations are as follows.

Molar ratio (A/B):polymerization ratio (molar ratio) between a monomer containing an aromatic ring represented by the formula (X-1) and a monomer containing an aliphatic hydrocarbon group represented by the formula (X-2)

Parallel arrangement: observation result from a direction that is vertical to the layer plane of the liquid crystal cured layer of the evaluation sample Tilt arrangement: observation result from a direction that tilts with respect to the layer plane of the liquid crystal cured layer of the evaluation sample

TABLE 3

[Results of Examples and Comparative Examples]

| | Orientation film composition | Liquid crystal | Orientation aid Molar ratio (A/B) | Amount | Observation of orientation state (Existence of light leakage) Parallel arrangement | Tilt arrangement | Tilt angle of main chain mesogen β [°] |
|---|---|---|---|---|---|---|---|
| Ex. 1 | (1) | (I-1) | 70/30 | 5 parts | No | Yes | 90.0 |
| Ex. 2 | (1) | (I-1) | 70/30 | 3 parts | No | Yes | 90.0 |
| Ex. 3 | (1) | (I-1) | 70/30 | 1 part | Very slight existence | Yes | 85.2 |
| Ex. 4 | (1) | (I-1) | 70/30 | 7 parts | No | Yes | 89.9 |
| Ex. 5 | (1) | (I-1) | 80/20 | 5 parts | No | Yes | 89.7 |
| Comp. Ex. 1 | (1) | (I-1) | — | — | Yes | — | — |
| Comp. Ex. 2 | None | (I-1) | 70/30 | 5 parts | Yes | — | — |

[Discussion]

As shown in Table 3, in Examples, the value of the tilt angle β of the main chain mesogen is 90° or a value close to 90°. In Examples, there was no or almost no light leakage in the parallel arrangement, which demonstrates that the orientation state is favorable. Therefore, it was confirmed that according to the present invention, a favorable vertical orientation state of the polymerizable liquid crystal compound was achieved, and a liquid crystal cured layer in which the main chain mesogen of the polymerizable liquid crystal compound was oriented in the thickness direction was realized.

In contrast to this, in Comparative Examples, orientation failure occurred in the polymerizable liquid crystal compound, and orientation defects occurred. As a result, the main chain mesogen of the polymerizable liquid crystal compound was unable to be oriented in the thickness direction.

REFERENCE SIGN LIST 110 substrate
120 orientation film
120U surface of orientation film 121 vertical orientation group
130 liquid crystal composition layer
130U air interface of liquid crystal composition layer
131 polymerizable liquid crystal compound
132 orientation aid
133 main chain of orientation aid
134 side chain of orientation aid

The invention claimed is:

1. A liquid crystal cured layer formed of a cured product of a liquid crystal composition, wherein
the liquid crystal composition contains a polymerizable liquid crystal compound having a reverse wavelength dispersion property, and a copolymer containing a monomer unit A including a monovalent group containing an aromatic ring and a monomer unit B containing a monovalent aliphatic hydrocarbon group optionally having a substituent,
the polymerizable liquid crystal compound in the liquid crystal cured layer has a main chain mesogen,
the liquid crystal cured layer has a layer plane,
the main chain mesogen is oriented at a tilt angle of 85° to 90° with respect to the layer plane of the liquid crystal cured layer,
the monomer unit A is represented by the following formula (A):

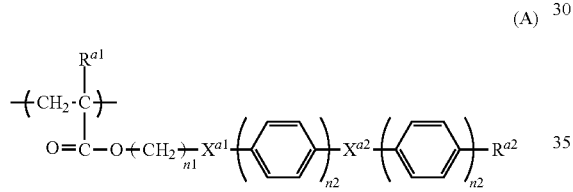

where
$R^{a1}$ represents a hydrogen atom or a methyl group;
each of $X^{a1}$ and $X^{a2}$ independently represents a divalent linking group;
$R^{a2}$ represents at least one selected from the group consisting of an alkyl group of 1 to 6 carbon atoms, an alkoxy group of 1 to 6 carbon atoms, a halogen atom, a cyano group, and an isocyanate group;
n1 represents an integer of 1 to 14;
n2 represents an integer of 1 or 2; and
n3 represents an integer of 1 or 2, and
the monomer unit B is represented by the following formula (B):

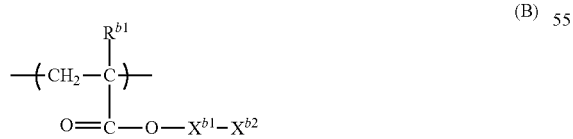

where
$R^{b1}$ represents a hydrogen atom or a methyl group;
$X^{b1}$ represents a single bond or a divalent linking group; and
$R^{b2}$ represents a monovalent aliphatic hydrocarbon group optionally having a substituent.

2. The liquid crystal cured layer according to claim 1, wherein the polymerizable liquid crystal compound is represented by the following formula (I):

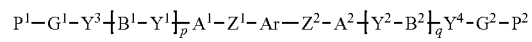

where
Ar is a group represented by any of the following formulae (II-1) to (II-7), wherein the group represented by any of the following formulae (II-1) to (II-7) may optionally have a substituent selected from the group consisting of a halogen atom, a cyano group, a nitro group, an alkyl group of 1 to 6 carbon atoms, an alkyl halide group of 1 to 6 carbon atoms, an N-alkylamino group of 1 to 6 carbon atoms, an N,N-dialkylamino group of 2 to 12 carbon atoms, an alkoxy group of 1 to 6 carbon atoms, an alkyl sulfinyl group of 1 to 6 carbon atoms, a carboxyl group, a thioalkyl group of 1 to 6 carbon atoms, an N-alkylsulfamoyl group of 1 to 6 carbon atoms, and an N,N-dialkylsulfamoyl group of 2 to 12 carbon atoms,

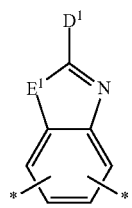

(II-1)

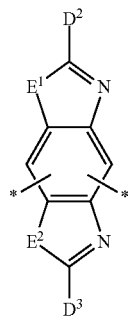

(II-2)

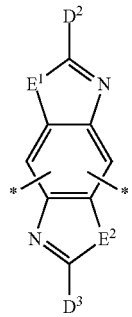

(II-3)

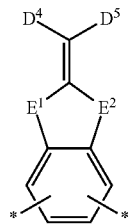

(II-4)

-continued (II-5)

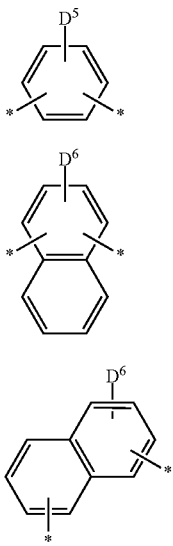

(II-6)

(II-7)

where
the symbol "*" represents a position for bonding with $Z^1$ or $Z^2$;
each of $E^1$ and $E^2$ independently represents a group selected from the group consisting of —$CR^{11}R^{12}$—, —$NR^{11}$—, —CO—, and —O—, and each of $R^{11}$ and $R^{12}$ independently represents a hydrogen atom or an alkyl group of 1 to 4 carbon atoms;
each of $D^1$ to $D^3$ independently represents an aromatic hydrocarbon ring group optionally having a substituent or an aromatic heterocyclic ring group optionally having a substituent;
each of $D^4$ to $D^5$ independently represents a non-cyclic group optionally having a substituent, and $D^4$ and $D^5$ may together form a ring; and
$D^6$ represents a group selected from the group consisting of —$C(R^f)$=N—N($R^g$)$R^h$, —$C(R^f)$=N—N=C($R^g$)$R^h$, and —$C(R^f)$=N—N=$R^i$, $R^f$ represents a group selected from the group consisting of a hydrogen atom; and an alkyl group of 1 to 6 carbon atoms, $R^g$ represents a group selected from the group consisting of a hydrogen atom; and an organic group of 1 to 30 carbon atoms optionally having a substituent, $R^h$ represents an organic group having one or more aromatic rings selected from the group consisting of an aromatic hydrocarbon ring of 6 to 30 carbon atoms and an aromatic heterocyclic ring of 2 to 30 carbon atoms, and $R^i$ represents an organic group having one or more aromatic rings selected from the group consisting of an aromatic hydrocarbon ring of 6 to 30 carbon atoms and an aromatic heterocyclic ring of 2 to 30 carbon atoms,
each of $Z^1$ and $Z^2$ independently represents one selected from the group consisting of a single bond, —O—, —O—$CH_2$—, —$CH_2$—O—, —O—$CH_2$—$CH_2$—, —$CH_2$—$CH_2$—O—, —C(=O)—O—, —O—C(=O)—, —C(=O)—S—, —S—C(=O)—, —$NR^{21}$—O—$CF_2$—, —$CH_2$—$CH_2$—, —$CF_2$—$CF_2$—, —O—$CH_2$—$CH_2$—O—, —CH=CH—C(=O)—O—, —O—C(=O)—CH=CH—, —$CH_2$—C(=O)—O—, —O—C(=O)—$CH_2$—, —$CH_2$—O—C(=O)—, —C(=O)—O—$CH_2$—, —$CH_2$—$CH_2$—C(=O)—O—, —O—C(=O)—$CH_2$—$CH_2$—, —$CH_2$—$CH_2$—O—C(=O)—, —C(=O)—O—$CH_2$—$CH_2$—, —CH=CH—, —N=CH—, —CH=N—, —N=C($CH_3$)—, —C($CH_3$)=N—, —N=N—, and —C≡C— and each of $R^{21}$'s independently represents a hydrogen atom or an alkyl group of 1 to 6 carbon atoms,
each of $A^1$, $A^2$, $B^1$, and $B^2$ independently represents a group selected from the group consisting of a cyclic aliphatic group optionally having a substituent, and an aromatic group optionally having a substituent,
each of $Y^1$ to $Y^4$ independently represents one selected from the group consisting of a single bond, —O—, —C(=O)—, —C(=O)—O—, —O—C(=O)—, —$NR^{22}$—C(=O)—, —C(=O)—$NR^{22}$—, —O—C(=O)—O—, —$NR^{22}$—C(=)—O—, —O—C(=O)—$NR^{22}$—, and —$NR^{22}$—C(=O)—$NR^{23}$—, and each of $R^{22}$ and $R^{23}$ independently represents a hydrogen atom or an alkyl group of 1 to 6 carbon atoms,
each of $G^1$ and $G^2$ independently represents an organic group selected from the group consisting of an aliphatic hydrocarbon group of 1 to 20 carbon atoms; and a group having a structure obtained by substituting one or more of methylene groups contained in an aliphatic hydrocarbon group of 3 to 20 carbon atoms with —O— or —C(=O)—, wherein a hydrogen atom contained in the organic group of $G^1$ and $G^2$ may be substituted with an alkyl group of 1 to 5 carbon atoms, an alkoxy group of 1 to 5 carbon atoms, or a halogen atom, with a proviso that methylene groups at both ends of $G^1$ and $G^2$ are not substituted with —O— or —C(=O)—,
each of $P^1$ and $P^2$ independently represents a polymerizable functional group, and
each of p and q independently represents 0 or 1.

3. The liquid crystal cured layer according to claim 1, wherein a molar ratio of the monomer unit A relative to the monomer unit B is 90:10 to 60:40.

4. An optical film comprising the liquid crystal cured layer according to claim 1.

5. The optical film according to claim 4, further comprising an orientation film.

6. The optical film according to claim 4, further comprising a substrate.

7. The optical film according to claim 4, further comprising a λ/4 plate.

8. A polarizing plate comprising the optical film according to claim 4, and a linear polarizer.

9. A display device comprising the polarizing plate according to claim 8.

10. A method for producing the liquid crystal cured layer according to claim 1, comprising:
a step of forming an orientation film;
a step of forming a layer of a liquid crystal composition on the orientation film; and
a step of curing the layer of the liquid crystal composition to obtain the liquid crystal cured layer.

* * * * *